(12) United States Patent
Yeow et al.

(10) Patent No.: US 11,918,529 B2
(45) Date of Patent: Mar. 5, 2024

(54) FLUID-DRIVEN ACTUATOR AND ITS APPLICATIONS

(71) Applicant: National University of Singapore, Singapore (SG)

(72) Inventors: Chen Hua Yeow, Singapore (SG); Hong Kai Yap, Singapore (MY); Wee Keong Benjamin Ang, Singapore (SG); Xinquan Liang, Singapore (CN)

(73) Assignee: National University of Singapore, Singapore (SG)

( * ) Notice: Subject to any disclaimer, the term of this patent is extended or adjusted under 35 U.S.C. 154(b) by 1237 days.

(21) Appl. No.: 16/479,931

(22) PCT Filed: Jan. 17, 2018

(86) PCT No.: PCT/SG2018/050028
§ 371 (c)(1),
(2) Date: Jul. 23, 2019

(87) PCT Pub. No.: WO2018/136004
PCT Pub. Date: Jul. 26, 2018

(65) Prior Publication Data
US 2019/0374422 A1    Dec. 12, 2019

(30) Foreign Application Priority Data
Jan. 23, 2017    (SG) .......................... 10201700565X

(51) Int. Cl.
*A61H 1/02*    (2006.01)
*B25J 9/00*    (2006.01)
(Continued)

(52) U.S. Cl.
CPC ......... *A61H 1/0285* (2013.01); *A61H 1/0288* (2013.01); *B25J 9/0006* (2013.01);
(Continued)

(58) Field of Classification Search
CPC ................ A61H 1/0285; A61H 1/0288; A61H 2201/1238; A61H 2201/1638;
(Continued)

(56) References Cited

U.S. PATENT DOCUMENTS 3,981,528 A    9/1976  Freudenberg
4,274,399 A *  6/1981  Mummert ............ A61H 1/0288
                                            128/DIG. 20
(Continued)

FOREIGN PATENT DOCUMENTS

CN    1764786 A    4/2006
CN    101622107 A    1/2010
(Continued)

OTHER PUBLICATIONS

Written opinion and ISR in International Application PCT/SG2018/050028.
(Continued)

*Primary Examiner* — Quang D Thanh
(74) *Attorney, Agent, or Firm* — JCIP; Joseph G. Chu; Jeremy I. Maynard

(57) ABSTRACT

A fluid-driven actuator 100 includes a bending actuator 200 including a first wall portion 201, a second wall portion 203 cooperating with the first wall portion 201 to define an undulating actuator profile. The bending actuator 200 also includes an inner fluid bladder 202 disposed between the first and second wall portions 201,203 and following the undulating actuator profile. The fluid-driven actuator 100 further includes a restraint member 300 arranged to cooperate with the bending actuator 200 to produce a plurality of motions in response to fluid supplied to the inner fluid bladder 202.

19 Claims, 42 Drawing Sheets

(51) Int. Cl.
 B25J 9/14 (2006.01)
 D06N 3/14 (2006.01)
 F15B 15/10 (2006.01)
(52) U.S. Cl.
 CPC .............. *B25J 9/142* (2013.01); *D06N 3/14* (2013.01); *F15B 15/103* (2013.01); *A61H 2201/1238* (2013.01); *A61H 2201/1638* (2013.01); *A61H 2201/1647* (2013.01); *A61H 2201/165* (2013.01); *A61H 2201/5012* (2013.01); *A61H 2201/5043* (2013.01); *A61H 2201/5064* (2013.01); *A61H 2201/5071* (2013.01); *A61H 2201/5092* (2013.01); *A61H 2201/5097* (2013.01); *D06N 2211/18* (2013.01)
(58) Field of Classification Search
 CPC ...... A61H 2201/1647; A61H 2201/165; A61H 2201/5012; A61H 2201/5043; A61H 2201/5064; A61H 2201/5071; A61H 2201/5092; A61H 2201/5097; A61H 1/006; A61H 1/02; A61H 9/0085; B25J 9/0006; B25J 9/142; B25J 13/02; D06N 3/14; D06N 2211/18; F15B 15/103
 See application file for complete search history.

(56) References Cited

U.S. PATENT DOCUMENTS

| | | | |
|---|---|---|---|
| 6,178,872 | B1 | 1/2001 | Schulz |
| 8,328,743 | B2 | 12/2012 | Farrell et al. |
| 2010/0305717 | A1 | 12/2010 | Tong et al. |
| 2015/0090113 | A1 | 4/2015 | Galloway |
| 2015/0217444 | A1 | 8/2015 | Asada et al. |
| 2015/0266186 | A1* | 9/2015 | Mosadegh ............ F15B 15/08 92/261 |
| 2015/0354547 | A1* | 12/2015 | Ting ........................ B32B 3/26 156/60 |
| 2016/0114482 | A1 | 4/2016 | Lessing et al. |
| 2016/0252110 | A1* | 9/2016 | Galloway ............ F15B 15/103 60/327 |
| 2019/0015233 | A1* | 1/2019 | Galloway ................ B25J 15/12 |

FOREIGN PATENT DOCUMENTS

| | | |
|---|---|---|
| CN | 106309083 A | 1/2017 |
| DE | 19617852 A1 | 10/1997 |
| EP | 1190819 A1 | 3/2002 |
| JP | 2006347 A | 1/2006 |
| SG | 11201609609 A1 | 12/2016 |
| WO | 2015066143 A1 | 5/2015 |
| WO | 2015191007 A1 | 12/2015 |
| WO | 2015191585 A1 | 12/2015 |
| WO | 2016172670 A1 | 10/2016 |
| WO | 2016210438 A1 | 12/2016 |

OTHER PUBLICATIONS

Connolly, F., Polygerinos, P., Walsh, C.J., Bertoldi, K., "Mechanical Programming of Soft Actuators by Varying Fiber Angle", Soft Robotics, vol. 2, No. 1, 2015, pp. 26-32.
Polygerinos, P., "Modeling of Soft Fiber-reinforced Bending Actuators", IEEE Transactions on Robotics, vol. 31, No. 3, Jun. 2015, pp. 778-789.
Galloway, K.C., Polygerinos, P., Walsh, C.J., Wood, R.J., "Mechanically programmable bend radius for fiber-reinforced soft actuators", 16th International Conference on Advanced Robotics, Nov. 2013, pp. 1-6.
Hu, X.L., et al., "The Effects of Post stroke Upper-limb Training with an Electromyography (EMG)-driven Hand Robot", Journal of Electromyopgrahy and Kinesiology, 23(5), 2013, pp. 1065-1074.
Butler, A.J., Blanton, S.R., Rowe, V.T., Wolf, S.L., "Attempting to improve function and quality of life using the FTM Protocol", Journal of Neurological Physical Therapy, 30(3), Sep. 2006, pp. 148-156.
Farrell, J.F., Hoffman, H.B., Snyder, J.L., Giuliani, C.A., Bohannon, R.W., "Orthotic aided training of the paretic upper limb in chronic stroke: results of a phase 1 trial", NeuroRehabilitation, 22(2), 2007, pp. 99-103.
McCombe Waller, S., Whitall, J., "The Sequential Combination of Bilateral and Unilateral Arm Training to Promote Arm and Hand Function in Patients with More Severe Paresis", University of Maryland, School of Medicine, Department of Physical Therapy and Rehabilitation Science, Baltimore, Maryland, USA, 2008.
Heise, K., Liuzzi, G., Zimerman, M., Gerloff, C., Hummel, F., "Intensive orthosis-based home training of the upper limb leads to pronouced improvements in patients in the chronic stage after brain lesions", Saebo, 2010.
Deering, J., Terry, K., Silver, N., Amling, L., Araniecke, C., Barry, J., "Will Upper Extremity Performance Change Following Use of a Dynamic Orthosis Exercise Session in Individuals with Chronic Stroke ?: A Pilot Study", Maryville University, St Louis, Missouri, 2009.
Krug, G., Ebert, A., Schmittgens, J., Stanley, H., "The Effectiveness of Bilateral vs. Unilateral Task Retraining Using the SaeboFlex Orthosis in Individuals with Sub-Acute or Chronic Stroke", Department of Occupational Therapy and Occupational Science, University of Missouri, 2010.
Kadowaki, Y. Noritsugu, T., Takaiwa, M., Sasaki, D., Kato, M., "Development of Soft Power-Assist Glove and Control Based on Human Intent", Journal of Robotics and Mechatronics, vol. 23, No. 2, 2011, pp. 281-291.
Polygerinos, P., Wang, Z., Galloway, K.C., Wood, R.J., Walsh, C.J., "Soft robotic glove for combined assistance and at-home rehabilitation", Robotics and Autonomous Systems, vol. 73, Nov. 2015, pp. 135-143.
Polygerinos, P. et al., "Soft Robotic Glove for Hand Rehabilitation and Task Specific Training", 2015 IEEE International Conference on Robotics and Automation, 2015, pp. 2913-2919.
Polygerinos, P., Galloway, K.C., Sanan, S., Herman, M., Walsh, C.J., "EMG Controlled Soft Robotic Glove for Assistance During Activities of Daily Living", 2015 IEEE International Conference on Rehabilitation Robotics, 2015, pp. 55-60.
Torens-Bonilla, B., Parietti, F., Asada, H.H., "Demonstration-based control of supernumerary robotic limbs", 2012 IEEE/RSJ International Conference on Intelligent Robots and Systems, 2012, pp. 3936-3942.
Parietti, F, Chan, K., Asada, H.H., "Bracing the human body with supernumerary Robotic Limbs for physical assistance and load reduction", 2014 IEEE International Conference on Robotics and Automation, 2014, pp. 141-148.
Davenport, C., Parietti, F., Asada, H.H., "Design and Biomechanical Analysis of Supernumerary Robotic Limbs", ASME 2012 5th Annual Dynamic Systems and Control Conference joint with the JSME 2012 11th Motion and Vibration Conference, 2012, pp. 1-7.
Sasaki, D., Noritsugu, T., Takaiwa, M., Yamamoto, H., "Wearable power assist device for hand grasping using pneumatic artificial rubber muscle", IEEE International Workshop on Robot and Human Interactive Communicatoin, Sep. 2004, pp. 655-660.
Mosadegh, B. et al., "Pneumatic Networks for Soft Robotics that Actuate Rapidly", Advanced Functional Materials, vol. 24, 2014, pp. 2163-2170.
Polygerinos, P. et al., "Modeling of Soft Fiber-Reinforced Bending Actuators", IEEE Transactions on Robotics, 2015, pp. 1-12.
Yap H.K., Ang B.W.K., Lim J.H., Goh J.C.H., Yeow R.C.H, "A Fabric-Regulated Soft Robotic Glove with User Intent Detection using EMG and RFID for Hand Assistive Application", IEEE International Conference on Robotics and Automation, May 2016, pp. 16-21.
Yap H.K., Lim J.H., Nasrallah F., Cho H.G.J., Yeow C.H., "Characterisation and evaluation of soft elastomeric actuators for hand assistive and rehabilitation applications", J Med Eng Technol, vol. 40, 2016, pp. 199-209.

(56) References Cited

OTHER PUBLICATIONS

Yap, H.K., "A Magnetic Resonance Compatible Soft Wearable Robotic Glove for Hand Rehabilitation and Brain Imaging", IEEE transactions on neural systems and rehabilitation engineering: a publication of the IEEE Engineering in Medicine and Biology Society, 2016, pp. 1-12.

Zhang, M., Mak, A.F., "In vivo friction properties of human skin", Prosthet Orthot Int, vol. 23, 1999, pp. 135-141.

Matheus, K., Dollar, A.M., "Benchmarking grasping and manipulation: Properties of the Objects of Daily Living.", IEEE/RSJ International Conference on Intelligent Robots and Systems, Oct. 2010, pp. 5020-5027.

Yap, H.K., Lim, J.H., Goh, J.C.H., Yeow, C.-H., "Design of a Soft Robotic Glove for Hand Rehabilitation of Stroke Patients with Clenched Fist Deformity using Inflatable Plastic Actuators", Journal of Medical Devices, vol. 10, 2016, 044504.

Fischer H.C. et al., "Use of a Portable Assistive Glove to Facilitate Rehabilitation in Stroke Survivors with Severe Hand Impairment", IEEE Trans Neural Syst Rehabil Eng, vol. 24, No. 3, 2016, pp. 344-351.

Herrnstadt, G., Alavi, N., Neva, J., Boyd, L.A., Menon, C., "Preliminary results for a force feedback bimanual rehabilitation system", 6th IEEE Conference of Biomedical Robotics and Biomechatronics, Jun. 2016, pp. 776-781.

Cauraugh, J.H., Lodha, N., Naik, S.K., Summers, J.J., "Bilateral movement training and stroke motor recovery progress: a structured review and meta-analysis", Hum Mov Sci, vol. 29, 2010, pp. 853-870.

Thieme, H., Mehrholz, J., Pohl, M., Behrens, J., Dohle, C., "Mirror therapy for improving motor function after stroke", Cochrane Database Syst Rev, 2012.

Examination Report No. 1 dated Apr. 5, 2023 for Australian Application No. 2018210750.

\* cited by examiner

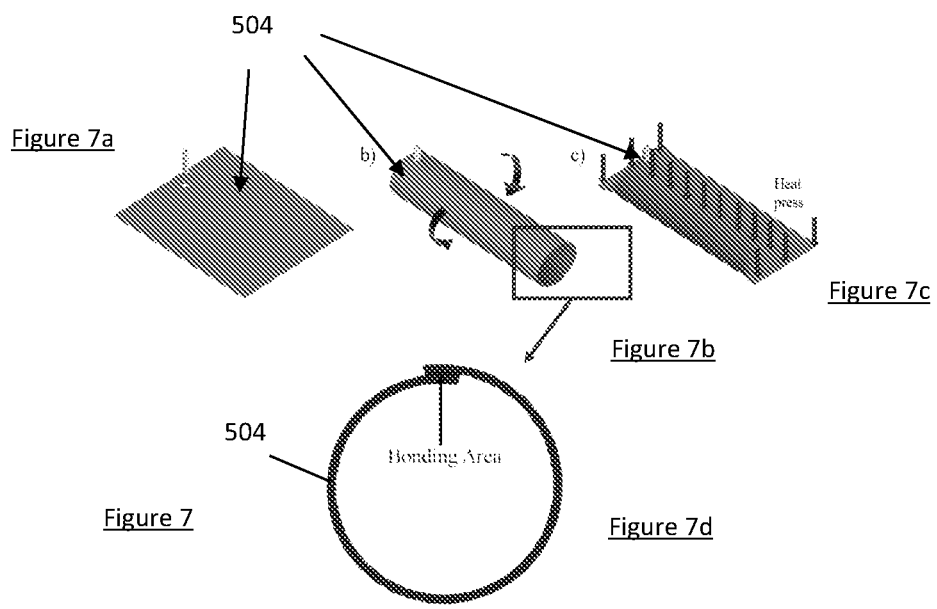

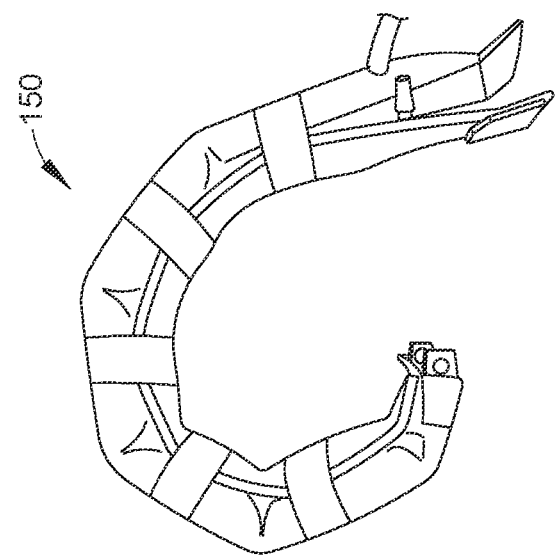
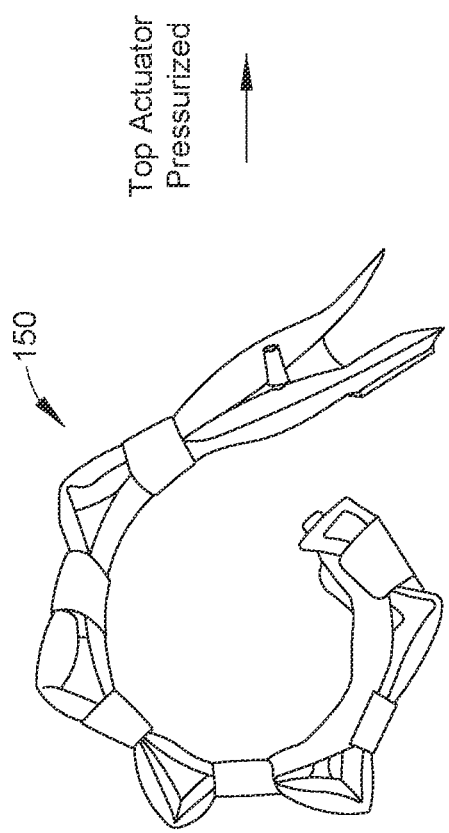
FIG. 8b
FIG. 8a
Top Actuator Pressurized

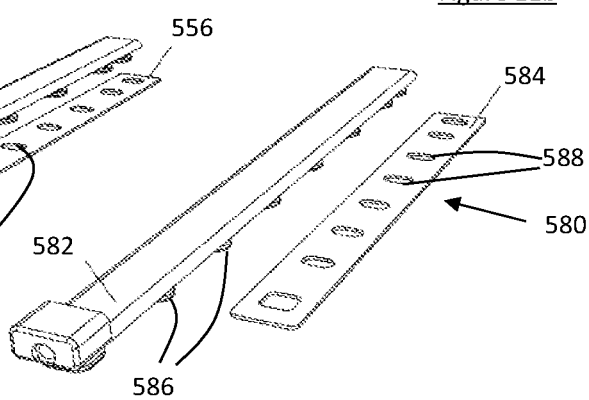
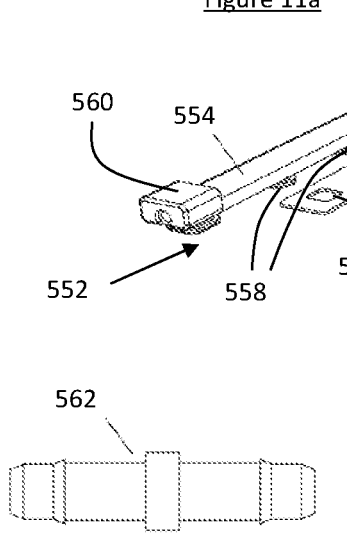
Figure 11a
Figure 11b
Figure 11c

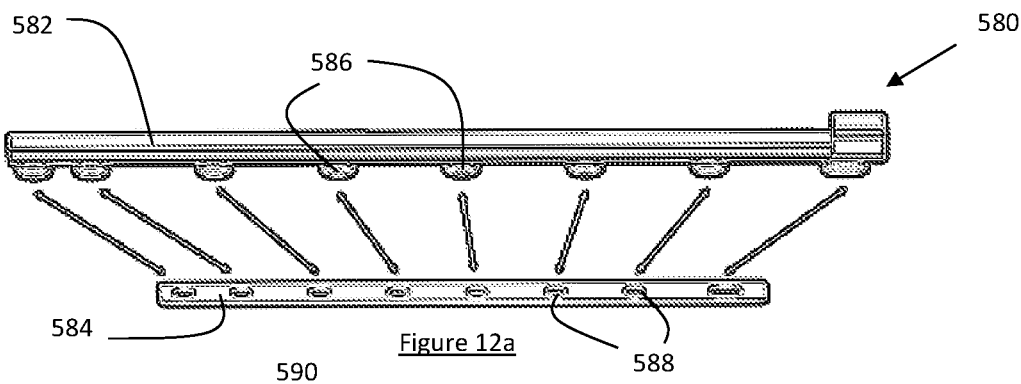
Figure 12a
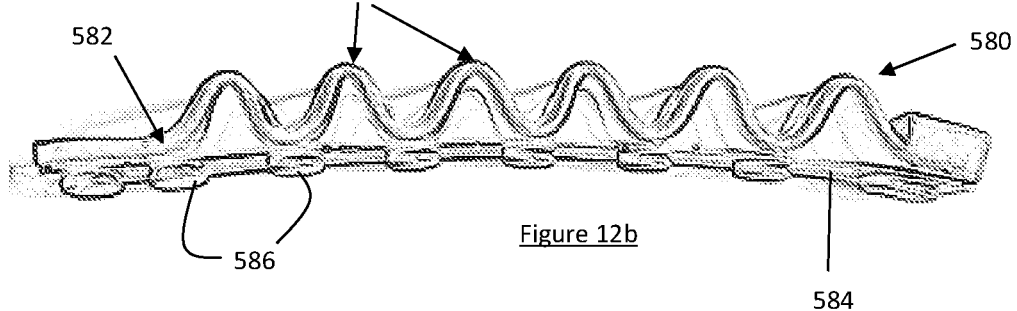
Figure 12b
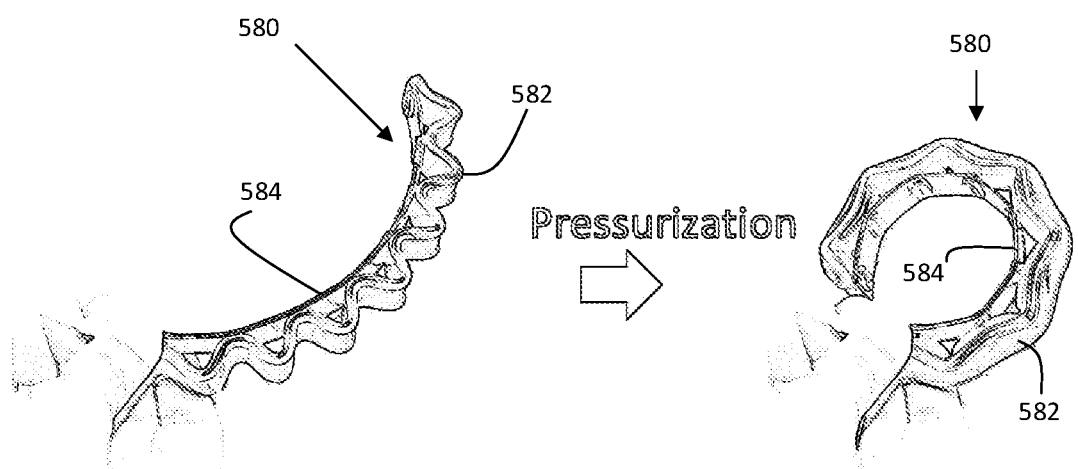
Figure 13a
Figure 13b

Figure 14: The settings used on the Simplify3D software that were important to a successful 3D printed actuator are as follows:

| Extruder | Extrusion Multiplier | 1.20 |
|---|---|---|
|  | Coasting at End | 2.0 mm |
| Layer | Primary Layer Height | 0.1mm |
|  | Outline/Perimeter Shells | 2 |
|  | Outline direction | Inside-Out |
|  | First Layer Height | 50% |
|  | First Layer Width | 120% |
|  | First Layer Speed | 60% |
| Infill | Fill Pattern | Rectilinear |
|  | Interior Fill Percentage | 100% |
|  | Outline Overlap | 20% |
|  | Infill Extrusion Width | 100% |
|  | Minimum Infill Length | 0.05mm |
| Temperature | Temperature | 230 °C |
| Cooling | Fan Speed | 0 |
| Others | Default Printing Speed | 32.0 mm/s |
|  | Extruder Movement Speed | 200 mm/s |
| Advanced | Avoid in crossing outline for travel movements option | Checked |

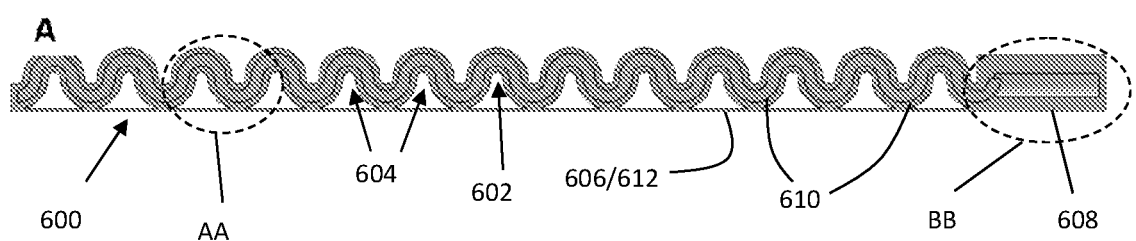
Figure 15
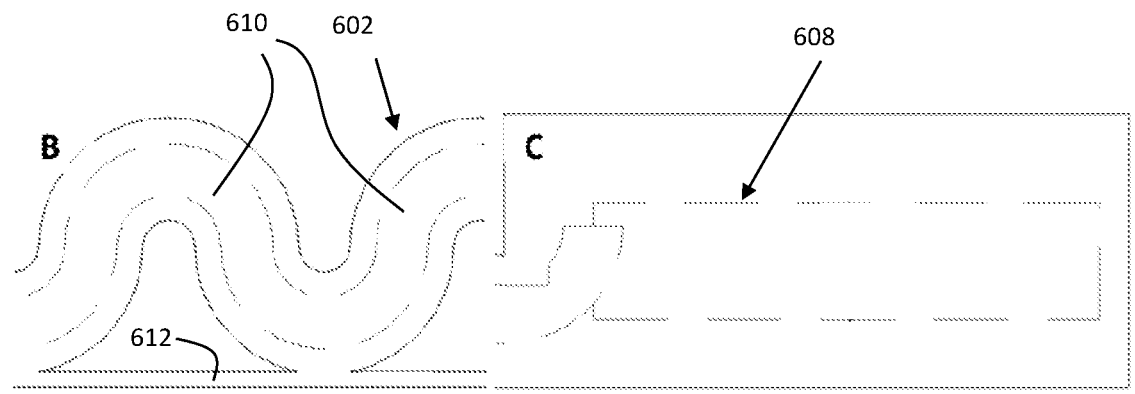

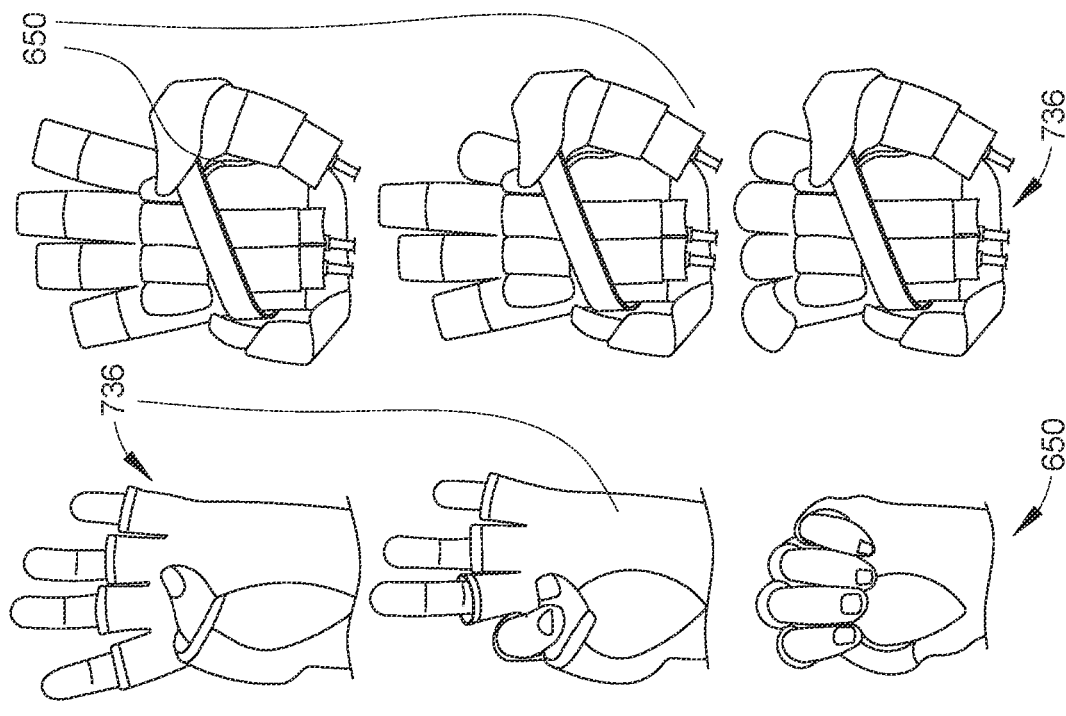
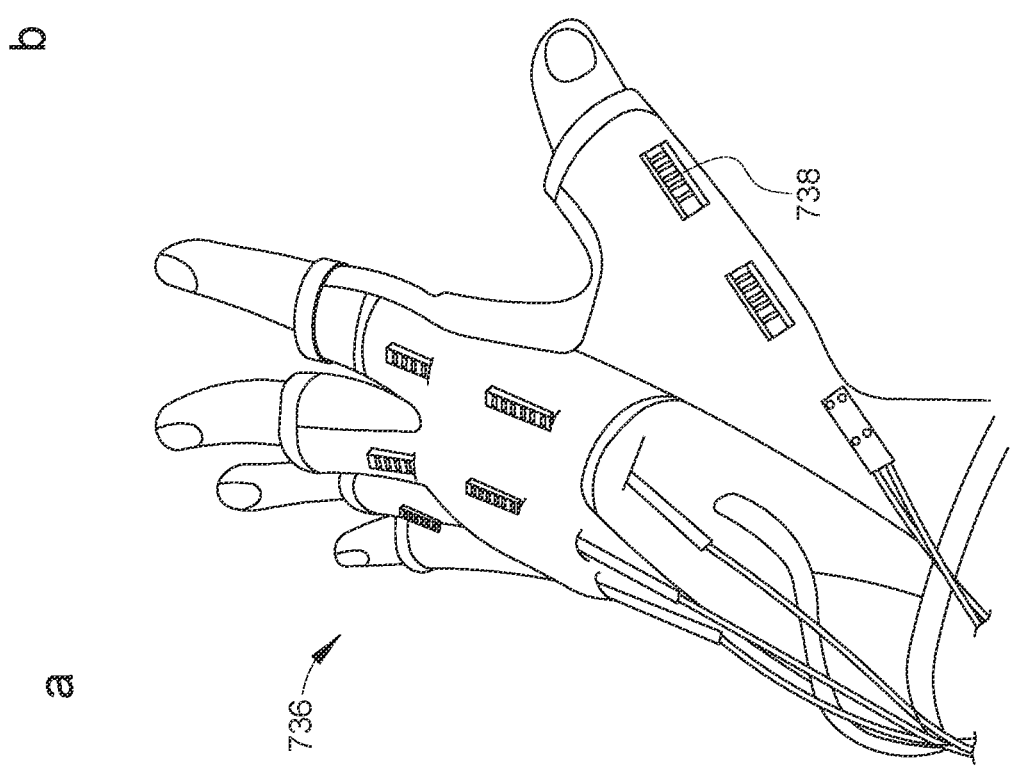
FIG. 25

Enhanced Uniform Bending & Force

Enhanced Distal Bending & Force

Enhanced Central Bending & Force

Front View

Bottom View

Side View

Isometric View

*Multi-directional Bending*
*Inflate A → Bend in A direction*
*Inflate B → Bend in B direction*
*Inflate A&B → Bend in C direction*

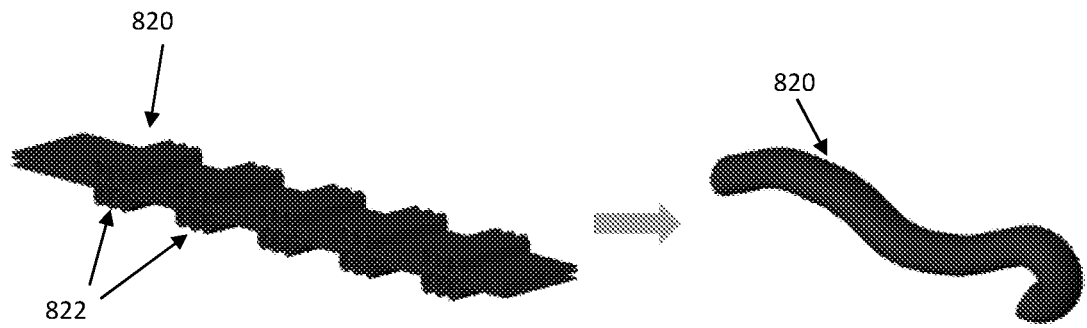
Figure 36a
Figure 36b
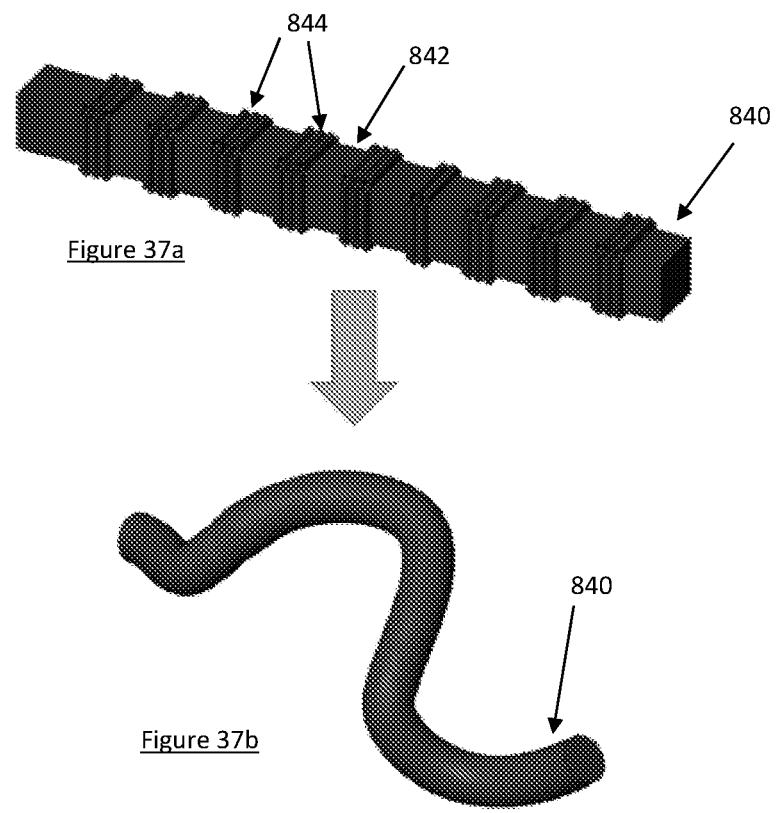
Figure 37a
Figure 37b

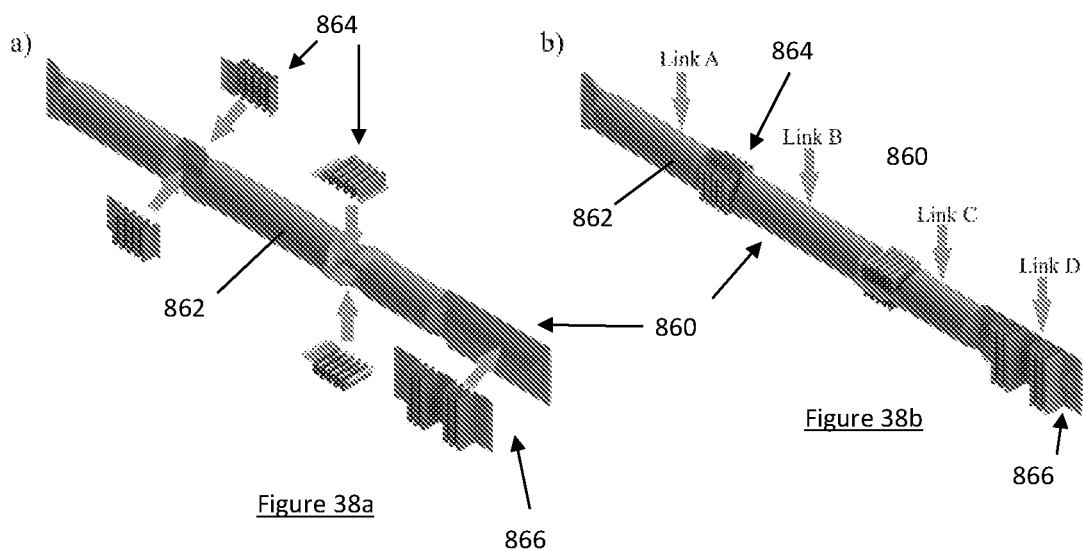
Figure 38a
Figure 38b
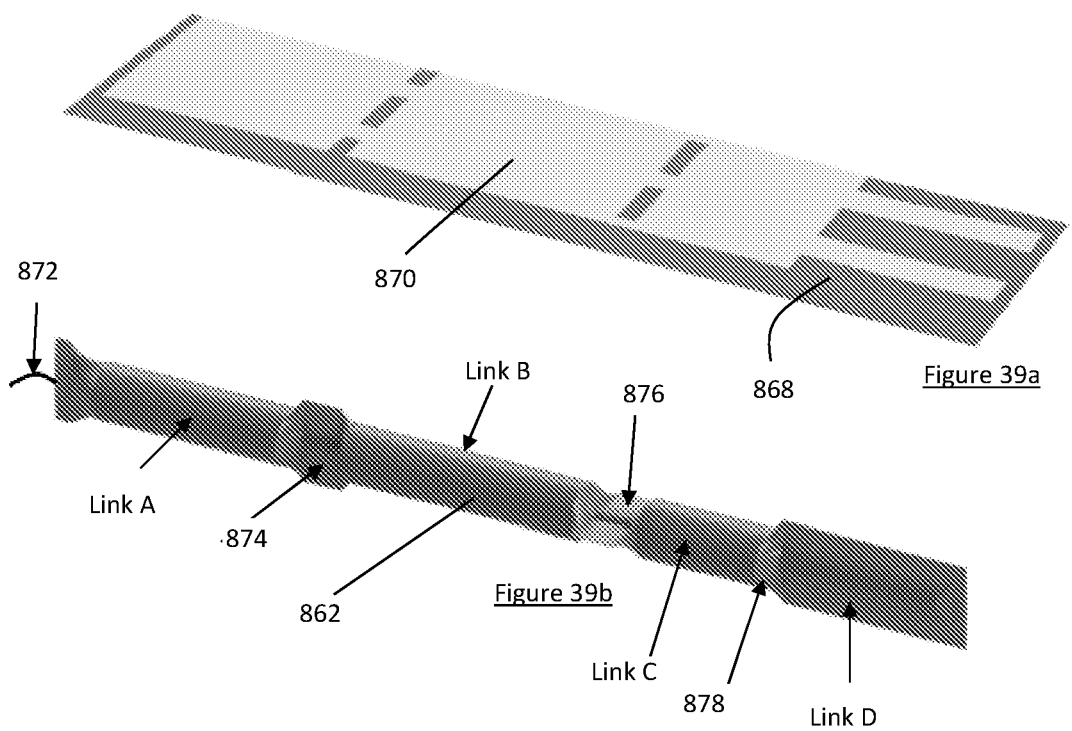
Figure 39a
Figure 39b

FLUID-DRIVEN ACTUATOR AND ITS APPLICATIONS

BACKGROUND AND FIELD

The invention relates to a fluid-driven actuator which may be used for assistive, rehabilitation, prosthetic, medical related applications or even industrial applications.

Soft actuators and related actuation systems have been used for assistive, rehabilitation, prosthetic, and manipulation applications. Upon fluid pressurization, the soft actuators are able to produce complex motions, forces and torques with multiple degrees of freedom (DOFs). The soft actuators can be integrated with industrial robotic arms for manipulation applications. Due to their inherent compliance and ability to adapt to the shape of the enclosed objects, the soft actuators can be useful when handling delicate objects or objects with part-to-part variance.

The soft actuators can be further integrated with wearable platforms, such as (but not limited to) soft glove, elbow brace, and belt for wearable applications such as soft wearable robotic exoskeletons, prosthetics, and supernumerary robotic arm or finger. These wearable platforms provide assistance and augmentation of activities of daily living and task-specific rehabilitation for human including healthy people, laborers, elderly, and patients with impaired mobility.

A most common barrier to adoption of assistive devices is user acceptance. End users are primarily concerned with cost, safety and ease of use of the assistive devices. Thus, a challenge is to develop assistive devices such as exoskeletons that are comfortable, affordable and functional. Prior consultation with clinicians has emphasized that the assistive device should not require a steep learning curve and is easy to be put on/taken off. In addition, the assistive devices should be flexible enough so that the assistive devices do not restrict the natural motions of a human joint and produce a wide range of motions.

It is desirable to provide a fluid-driven actuator which addresses at least one of the drawbacks of the prior art and/or to provide the public with a useful choice.

SUMMARY

In a first aspect, there is provided a fluid-driven actuator comprising a bending actuator including a first wall portion, a second wall portion cooperating with the first wall portion to define an undulating actuator profile, and an inner fluid bladder disposed between the first and second wall portions and following the undulating actuator profile, and a restraint member arranged to cooperate with the bending actuator to produce a plurality of motions in response to fluid supplied to the inner fluid bladder.

The described embodiments enable the fluid-driven actuator to be customizable and provide natural and compliant actuation. Also, different methods may be used to make the fluid-driven actuator and allows various materials such as fabrics to be used which reduces the weight of the assistive device. With the possibility of using soft and flexible components (soft actuators, soft interfaces) that are cheaper and lighter, when the fluid-driven actuator is incorporated into an assistive device, the device is more comfortable, wearable and affordable than the current devices in the market. Therefore, it has the potential to reduce the risks and barriers to market entry.

In one embodiment, the restraint member may be fixedly coupled to the bending actuator to form a plurality of folds to define the undulating actuator profile.

In another embodiment, the restraint member may be detachably coupled to the bending actuator to form a plurality of folds to define the undulating actuator profile. In such an embodiment, each one of the plurality of folds may form a fold width which is adjustable by a user. The bending actuator may include a plurality of flexion locking mechanisms, and the restraint member may include a plurality of restraint locking mechanisms arranged to be selectively attached to respective ones of the plurality of flexion locking mechanisms.

Preferably, each one of the plurality of folds may be spaced apart from each other. The plurality of folds may include segments of folds spaced apart from each segment. The number of folds within each segment may be different. Alternatively, the number of folds within each segment may be the same. In a specific embodiment, the restraint member may be cylindrical and each segment of folds may be arranged around the restraint member.

Preferably, the fluid-driven actuator may further comprise a secondary bending actuator having an inner secondary fluid bladder. The secondary bending actuator may be arranged in opposing relations with the bending actuator with each fold of the secondary bending actuator in registration with respective folds of the bending actuator. The secondary bending actuator may be arranged above the bending actuator with each fold of the secondary bending actuator in registration with respective folds of the bending actuator.

Advantageously, the inner secondary fluid bladder and the inner fluid bladder may be arranged to be supplied with fluid independently. The secondary fluid bladder may include at least two different segments which are arranged to be supplied with fluid independently.

Preferably, the inner fluid bladder may include at least two different segments which are arranged to be supplied with fluid independently.

The fluid-driven actuator may further comprise a plurality of the bending actuators, and pairs of the bending actuators may be arranged in opposing relations at respective segments of the restraint member, wherein the pair of the bending actuators in one segment is oriented differently from the other pair of bending actuators in another segment. The plurality of bending actuators may further include a further pair of bending actuators next to each other in a further segment. Preferably, the restraint member may include a strain limiting layer for causing the bending actuator to flex in response to fluid supplied to the inner fluid bladder.

Advantageously, the restraint member may include an integrally formed inner straightening fluid bladder, and the inner straightening fluid bladder may be arranged to straighten the restraint member longitudinally in response to fluid supplied to the inner straightening fluid bladder.

The fluid-driven actuator may be made of TPU coated fabric, one or more layers of polymer, or network of fibres. Advantageously, the inner fluid bladder may be integrally formed with the bending actuator.

It is envisaged that the bending actuator may be combined or used with a conventional actuator. For example, the fluid-driven actuator may comprise a bellow-type actuator; and the bending actuator is arranged on the bellow-type actuator.

The fluid-driven actuator has a variety of applications and uses. For example, in further aspects, there is provided an assistive device for rehabilitation or prosthetic applications, a robotic glove or an exoskeleton brace for a limb, comprising at least one fluid-driven actuator as discussed above.

In a further aspect, there is provided a method of producing a fluid-driven actuator according to the above features, comprising integrally forming the bending actuator with the inner fluid bladder. Preferably, the integrally forming may include forming an elongate actuator having the inner fluid bladder by casting or molding; and folding the elongate actuator to form the bending actuator.

The method may further comprise attaching the bending actuator to the restraint member.

In an exemplary embodiment, the method may further comprise 3D printing the bending actuator with the inner fluid bladder.

It is also possible that the method may comprise bonding a TPU-coated fabric to form the inner fluid bladder; and folding the inner fluid bladder to form the bending actuator. In this case, the method may further comprise bonding the bending actuator to the restraint member.

It should be appreciated that features relevant to one aspect may also be relevant to the other aspects.

BRIEF DESCRIPTION OF THE DRAWINGS

An exemplary embodiment will now be described with reference to the accompanying drawings, in which:

FIG. 7 comprising FIGS. 7a-7d describe an exemplary process for flat seam tube bonding a fabric as used in the alternative method of FIGS. 6a and 6b;

FIG. 8a illustrates the fluid-driven actuator of FIG. 6c in an inactive state, and FIG. 8b illustrates the fluid-driven actuator of FIG. 8a in an active state;

FIG. 10 is a graph illustrating torque measurements at different flexion angles of the fluid-driven actuator of FIG. 8a;

FIGS. 11a and 11b are two examples of the fluid-driven actuator of FIG. 1 formed using molding or casting method;

FIG. 11c is an air inlet for use with the exemplary fluid-driven actuators of FIGS. 11a and 11b to allow air to be supplied into the fluid-driven actuator;

FIG. 12a illustrates side views of the second fluid-driven actuator of FIG. 11b;

FIG. 12b illustrates how a second actuator body of the second fluid-driven actuator of FIG. 11b is folded to form a bending actuator with an integrally formed fluid bladder;

FIG. 13a illustrates the second fluid-driven actuator of FIG. 12b in an inactive state, and FIG. 13b illustrates the second fluid-driven actuator of FIG. 13a in an active state;

FIG. 14 is a table to illustrate settings for a Simplify 3D slicer software to produce the fluid-driven actuator of FIG. 1 using 3D printed technology;

FIG. 15A illustrates a cross sectional view of a 3D printed actuator in the form of a pneumatic actuator based on the setting of FIG. 14;

FIG. 15B an enlarged cross sectional view of portion AA of FIG. 15A to illustrate an inner bladder or cavity more clearly;

FIG. 15C is an enlarged cross sectional view of portion BB of FIG. 15A to illustrate a connecting section more clearly;

FIGS. 24a and 24b illustrate the robotic glove of FIG. 19 being subject to an intention-driven strategy which is one of the control modes of the GUI of FIG. 22;

FIG. 24c is a graph illustrating muscle signals collected from certain muscles during a power grip as initiated by the robotic glove as illustrated in FIG. 24a;

FIGS. 25a and 25b illustrate how the robotic glove of FIG. 19 may be subjected to a bilateral rehabilitation training mode;

FIG. 36a illustrates a multi-segment robotic arm similar to the robotic arm of FIG. 35 but with multi-segments to achieve a more complex bending modality;

FIG. 36b is a simplified representation of the multi-segment robotic arm of FIG. 36a to illustrate the bending modality;

FIG. 37a illustrates a multi-degree robotic arm which is able to bend or flex in varying angles in a three-dimensional space;

FIG. 37b is a simplified representation of the multi-degree robotic arm of FIG. 37a to illustrate the flexing degrees;

FIG. 38a illustrates an alternative multi-degree robotic arm called fabric-based soft robotic arm (SRA) in unassembled form that can manipulate objects within a 3-dimensional workspace;

FIG. 38b illustrates the SRA of FIG. 38a in assembled form;

FIGS. 39a and 39b show the fabrication of the SRA of FIGS. 38a and 38b which has a one long cylindrical SRA main body and a diameter of 6.6 cm;

DETAILED DESCRIPTION OF PREFERRED EMBODIMENT

Figure 1:
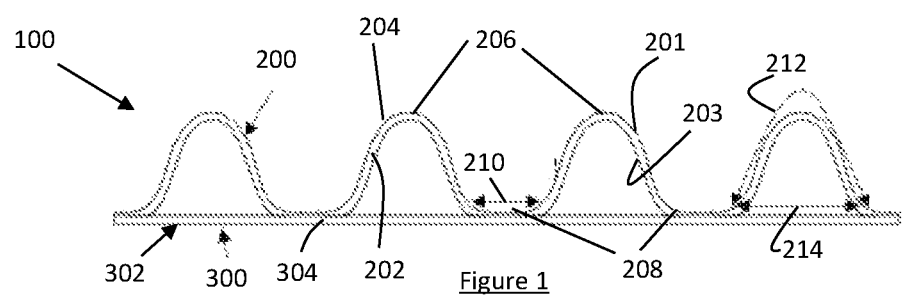
FIG. 1 is a front view of a fluid-driven actuator having an inner fluid bladder and in an inactive state according to a preferred embodiment.

FIG. 1 illustrates a fluid-driven actuator 100 in an inactive state according to a preferred embodiment. The fluid-driven actuator 100 includes a bending actuator 200 having a first wall portion 201 and a second wall portion 203 cooperating with the first wall portion 201. The first and second wall portions 201,203 define an undulating actuator profile as formed by a number of folds 204 which form a series of ridges 206 and grooves 208. In the embodiment of FIG. 1, there are four folds 204 resulting in four ridges 206 and three grooves 208. The folds 204 of the bending actuator 200 thus forms fold spacings 210 between folds 204 and each fold 204 also has a fold length 212 and fold width 214.

The fluid-driven actuator 100 further includes an inner fluid bladder 202 disposed between the first and second wall portions 201,203. In other words, the inner fluid bladder 202 follows the undulating actuator profile. Since the inner fluid bladder 202 also has the undulating actuator profile of the bending actuator 200, longitudinal axis of the inner fluid bladder 202 also forms the folds 204. In this embodiment, the inner fluid bladder's internal chamber 202 is arranged to be supplied with compressed fluid to expand or inflate the inner fluid bladder 202 and this will be explained further later.

The fluid-driven actuator 100 further includes a restraint member 300 arranged to cooperate with the bending actuator 200. In this embodiment, the restraint member 300 is in the form of a secondary actuator 302 which is generally flat and elongate. The secondary actuator 302 is bonded to the grooves 208 of the bending actuator 200 and includes a secondary inner fluid bladder 304, and FIG. 1 illustrates the secondary actuator 302 in an inactive state since the secondary inner fluid bladder 304 is not inflated. In other words, similar to the inner fluid bladder 202 of the bending actuator 200, the secondary inner fluid bladder 304 is arranged to be supplied with compressed air to expand or inflate the secondary inner fluid bladder's chamber 304, which would produce a linear or straightening motion and thus, the secondary actuator 302 may also be regarded as an extension actuator.

Figure 2:
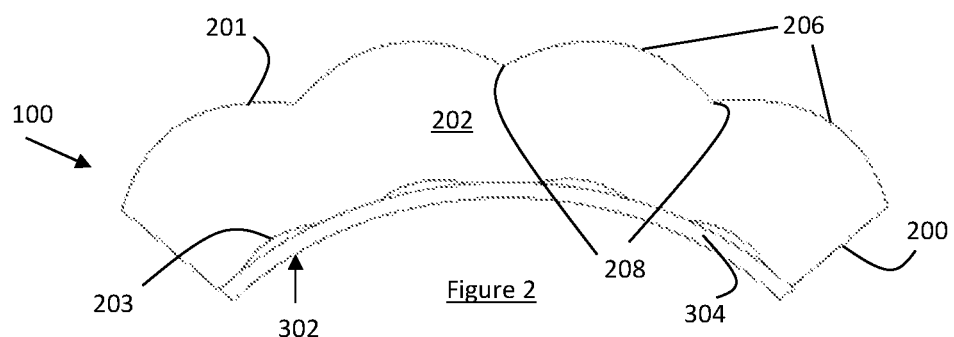
FIG. 2 shows the fluid-driven actuator of FIG. 1 with the inner fluid bladder inflated so that the fluid-driven actuator is in an active state to produce a bending motion.
Figure 3:
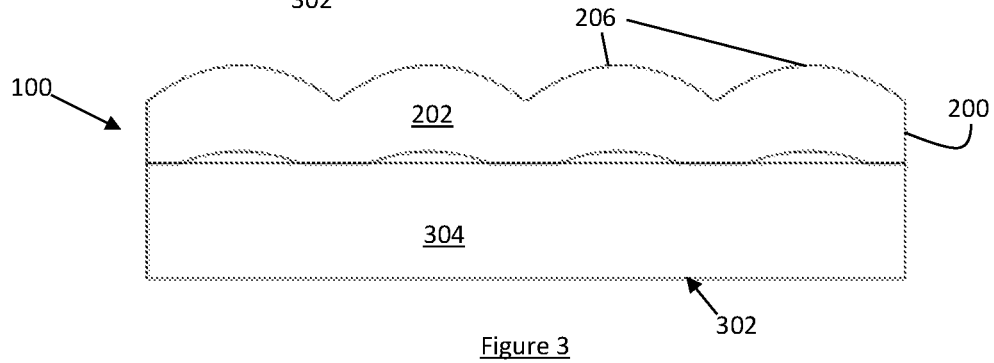
FIG. 3 shows the fluid-driven actuator of FIG. 1 in an active state to produce a straightening motion.

To enable the fluid-driven actuator 100 to produce a plurality of motions, compressed air or pneumatic pressure is supplied to either or both of the inner fluid bladders 202, 304. FIG. 2 illustrates pressured air being supplied to the inner fluid bladder 202 to inflate the entire bending actuator 200 and as shown, the creases or folds 204 would swell as well. Since one side of the bending actuator 200 is bonded to the secondary actuator 302, elongation on the bonded side is restricted. Therefore, the fluid-driven actuator 100 would bend towards the bonded side at the grooves 208 due to the inflation of the folds 204. As a result, by adjusting the pressure supplied to the bending actuator 200 and/or the secondary actuator 302, the bending modality of the fluid-driven actuator 100 can be controlled. When the secondary actuator 302 is supplied with ample air in the secondary inner fluid bladder 304, this can counter the effect of the expanded bending actuator 200 and the fluid-driven actuator 100 would thus straightened again as shown in FIG. 3. In this way, the secondary actuator 302 cooperates with the bending actuator 200 to produce a plurality of flex motions, such as bending, twisting, straightening, extending and other complex motions with varying forces and torques with multiple degrees of freedom (DOF).

Three exemplary manufacturing or fabrication techniques of the fluid-driven actuator 100 would next be described, in particular integral forming of the inner fluid bladders 202, 304, and they are:

A. Bonding process (using textiles and fabrics through heat press and ultrasonic welding);
B. Casting/molding (using polymers such as, but not limited to Thermoplastic Urethane (TPU), Thermoplastic Elastomer (TPE), Silicone Rubber); and
C. 3D printing and additive manufacturing (using polymers such as, but not limited to Thermoplastic Urethane (TPU), Thermoplastic Elastomer (TPE).

Figure 4:
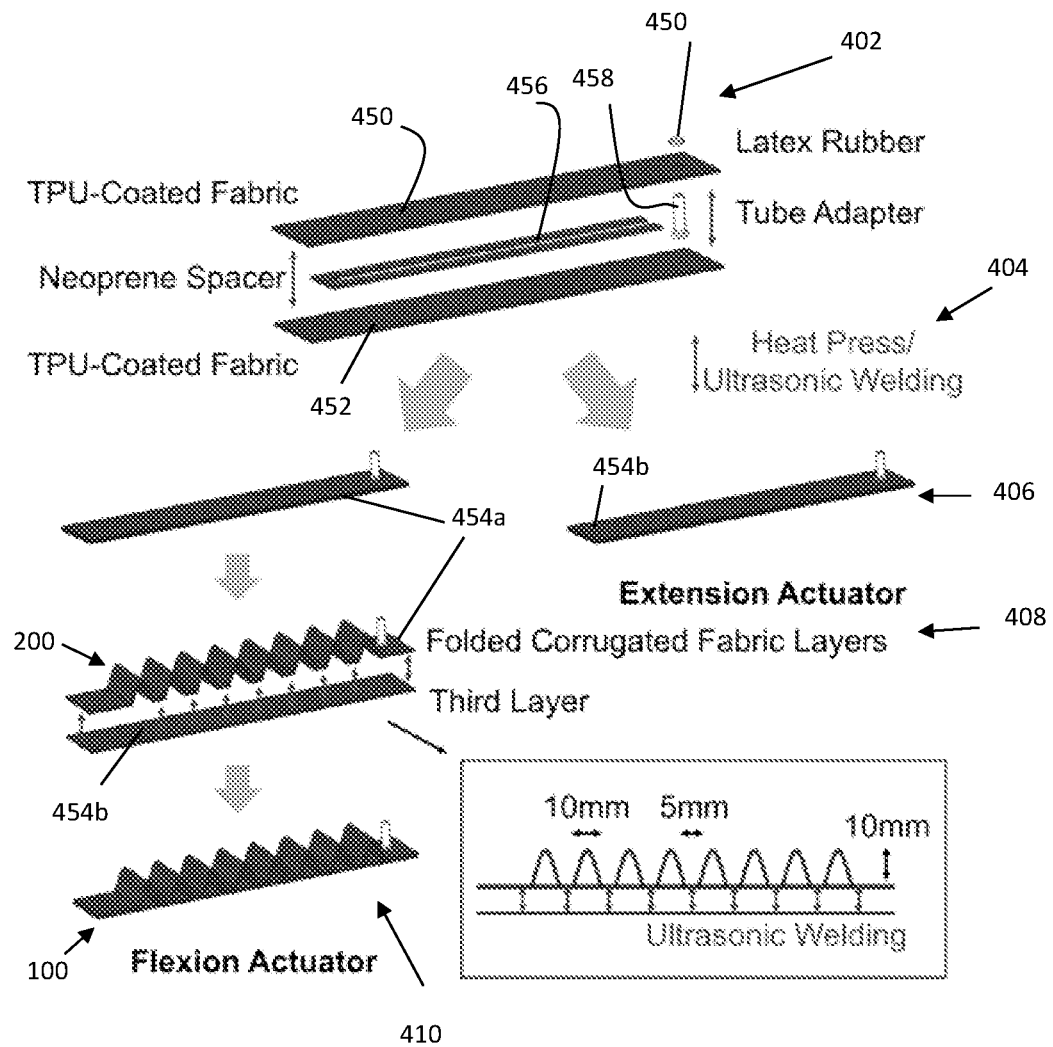
FIG. 4 illustrates steps to produce the fluid-driven actuator of FIG. 1 using fabric, heat press and ultrasonic welding.

A. Bonding Process (Using Textiles and Fabrics Through Heat Press and Ultrasonic Welding);

FIG. 4 illustrates the steps to produce the fluid-driven actuator 100 using this method which uses pieces of flexible thermoplastic polyurethane (TPU)-coated fabrics. As this type of fabric is flexible but not extensible, it minimizes energy losses due to the work stored as elastic energy and increases the efficiency of fluid power transmission. In step 402, two pieces of TPU coated fabric 450,452 which are generally flat and elongate and of required lengths are used to form an air bladder 454a. A neoprene sponge (733-6731, RS Components, Singapore) is used to serve as a spacer 456 to reduce the restriction of airflow within the air bladder 454a and the spacer 456 is sandwiched between the two pieces of TPU coated fabric 450,452. Further, a tube adapter 458 is inserted into the upper TPU coated fabric 450 and a latex rubber 460 is inserted to the interface between the upper TPU coated fabric 450 and the tube adapter 458 in order to prevent air leakage.

At step 404, the two pieces of TPU coated fabric 450,452 are subject to either mechanical pressure using a heat sealer or by industrial standard ultrasonic welding to seal the edges of the TPU coated fabrics 450,452 to form the air bladder 454a. In other words, after the sealing, an internal air chamber is formed within the air bladder 454a. Steps 402 and 404 are similarly performed to produce a second air bladder 454b as shown in step 406 of FIG. 4.

Next, at step 408, the first air bladder 454a is folded to form the bending actuator 200 of FIG. 1 with the series of folds 204 and the second air bladder 454b is used as the secondary actuator 302 of FIG. 1. In other words, the second air bladder 454b is bonded to the first air bladder 454a at the grooves 208 of the folds 204 using ultrasonic welding and the fluid-driven actuator 100 is thus formed in step 410 with the first air bladder 454a formed integrally within the bending actuator 200, and the second air bladder 454b integrally formed within the secondary actuator 302. Upon pressurization, the corrugated fabric layers of the bending actuator 200 and the secondary actuator 302 expand and unfold. The secondary actuator 302 serves as the restraint member layer to restrict the elongation at the bottom surface. This results in the bending of the fluid-driven actuator 100 upon actuation as can be appreciated from FIGS. 5(a) to 5(c).

Figure 5:
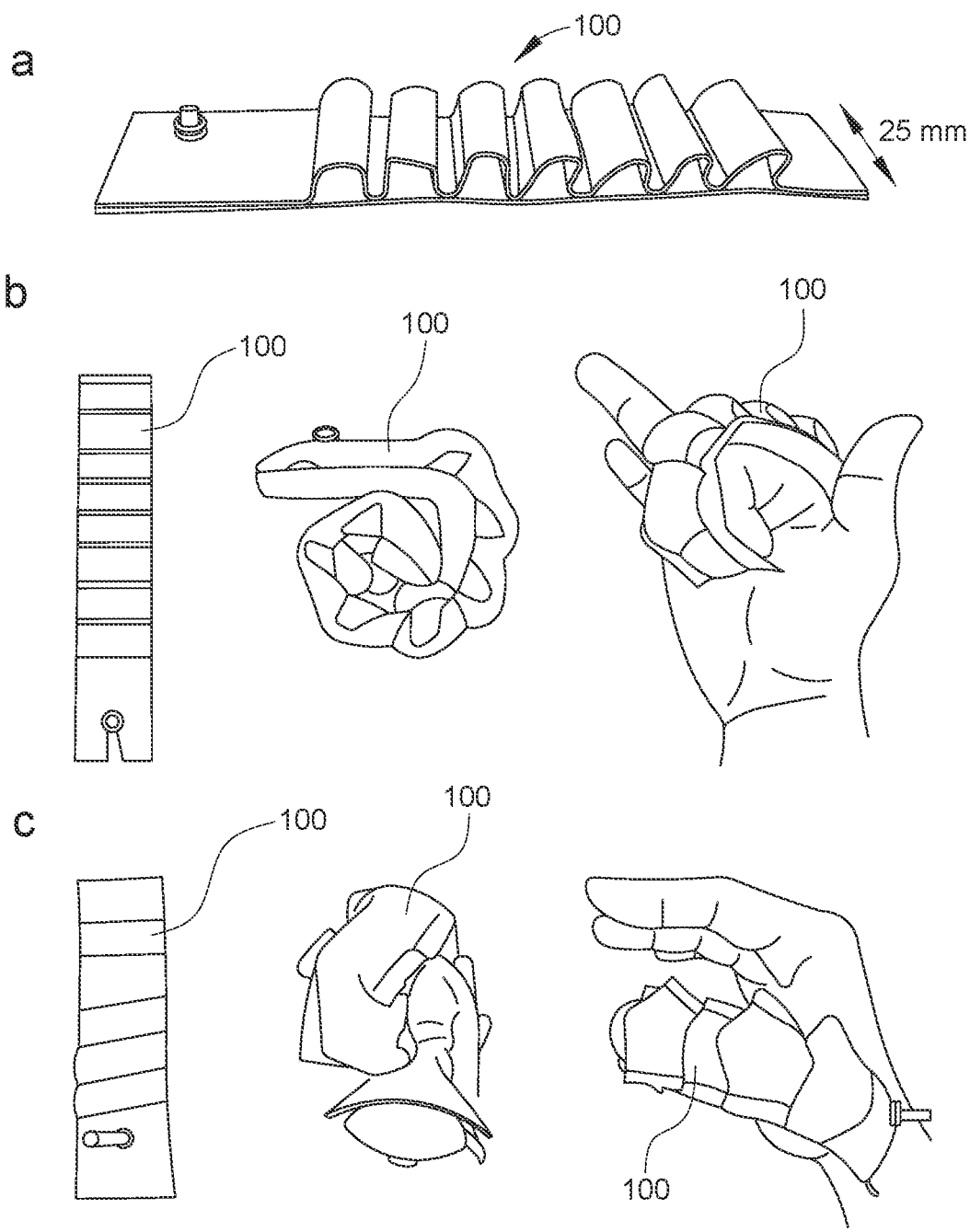
FIG. 5(a) is a pictorial view of the fluid-driven actuator produced using the method of FIG. 4, and FIGS. 5(b) and 5(c) illustrate the possible actuation motions of the fluid-driven actuator.

FIG. 5(a) is a pictorial view of the fluid-driven actuator 100 produced using the method of FIG. 4, and FIGS. 5(b) and 5(c) illustrate the possible actuation motions of the fluid-driven actuator 100 when used as a finger flexion actuator that allows bending motion that supports the finger flexion and thumb with slanted fold near the proximal side to allow bending and twisting motions that support the thumb interphalangeal (IP), metacarpophalengeal (MCP), and carpometacarpal (CMC) joint motions that are more complicated.

Combining both bending and extension actuators 200, 302, the fluid-driven actuator 100 is able to generate flexion and extension torques to support bidirectional movements of the joints (such as fingers, wrist and elbow). When air is injected into the actuators 200,302, the inner fluid bladders 202,304 would inflate, and the outer fabrics that are asymmetrically designed would guide the motions of the actuators 200,302. The fluid-driven actuator 100 developed in this way generate motions without any external bladder (the fabric itself is the bladder), which further reduce the weight and the complexity of the fabrication process.

In the method of FIG. 4, the two fabric pieces 450,452 are heat sealed along the edges but the TPU coating along edges of the fabric pierces 450,452 may be inadequate. Thus, it may be difficult to apply high pressure at the edges of the fabric pieces 450,452 to achieve high stiffness or large force as it may tear the sealed edge.

Thus, an alternative sealing method is proposed and this is further elaborated with reference to FIGS. 6 and 7. As illustrated in FIG. 6, at step 602, a single piece of TPU-coated fabric 500, larger than what was used in the method of FIG. 4 is used and two folding lines (Folding Line 1 and 2) marked and a marking tape pasted between the two folding lines. A tube hole 502 is also created at one edge of the TPU-coated fabric 500. At step 604, the TPU-coated fabric 500 is folded inwardly along the two folding lines so that a long edge overlaps with the other long edge and both overlapped portions are then bonded together. This bonding process is further elaborated in FIG. 7 which uses an exemplary piece of fabric 504 to explain. FIG. 7a shows the piece of fabric 504 laid flat and FIG. 7b shows longer edges wrap and overlapped with each other as shown in FIG. 7d, which is an end view of FIG. 7b. Next, the overlap portions are then sealed using "flat seam tube bonding" to prevent breaking and tearing. Finally, the shorter edges are sealed using the same method as shown in FIG. 7c to create an airtight pocket within the fabric 504.

Figure 6A:
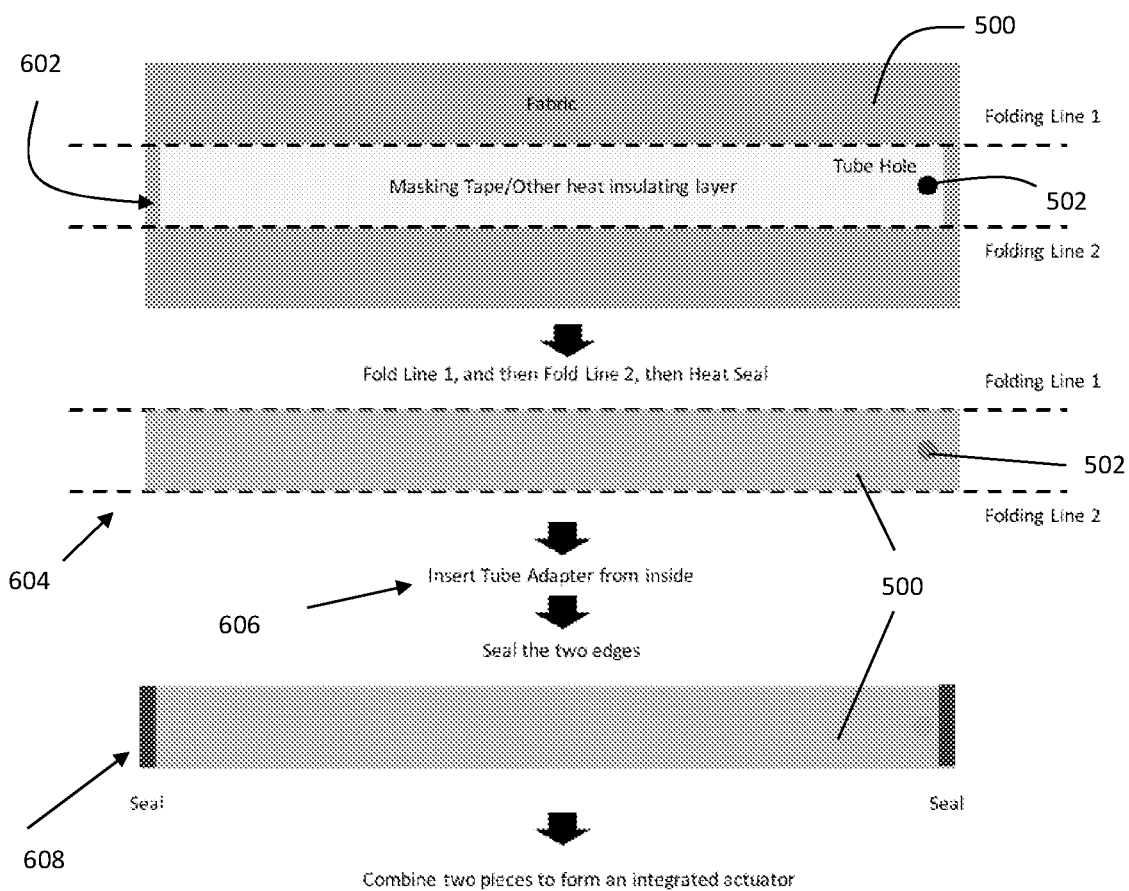
FIGS. 6a and 6b describe an alternative method of forming a fabric-based fluid-driven actuator.
Figure 6B:
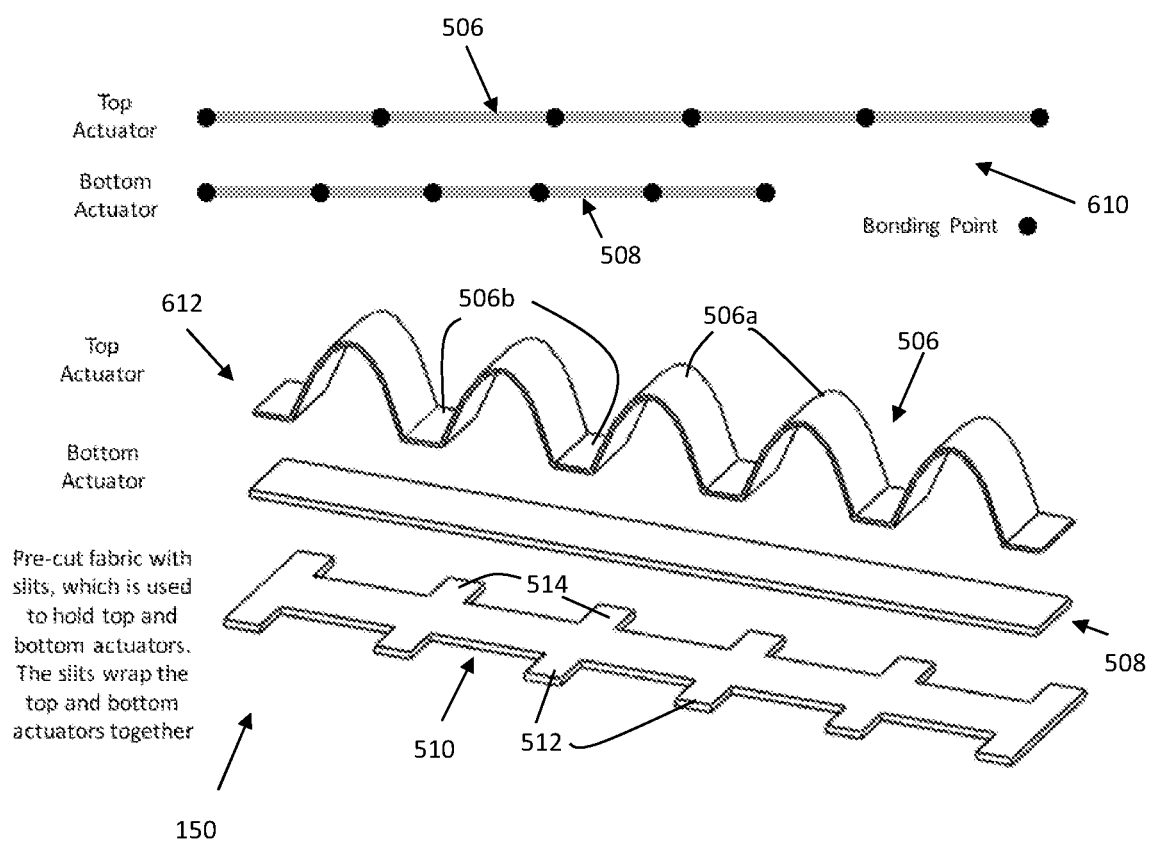
Figure 6C:
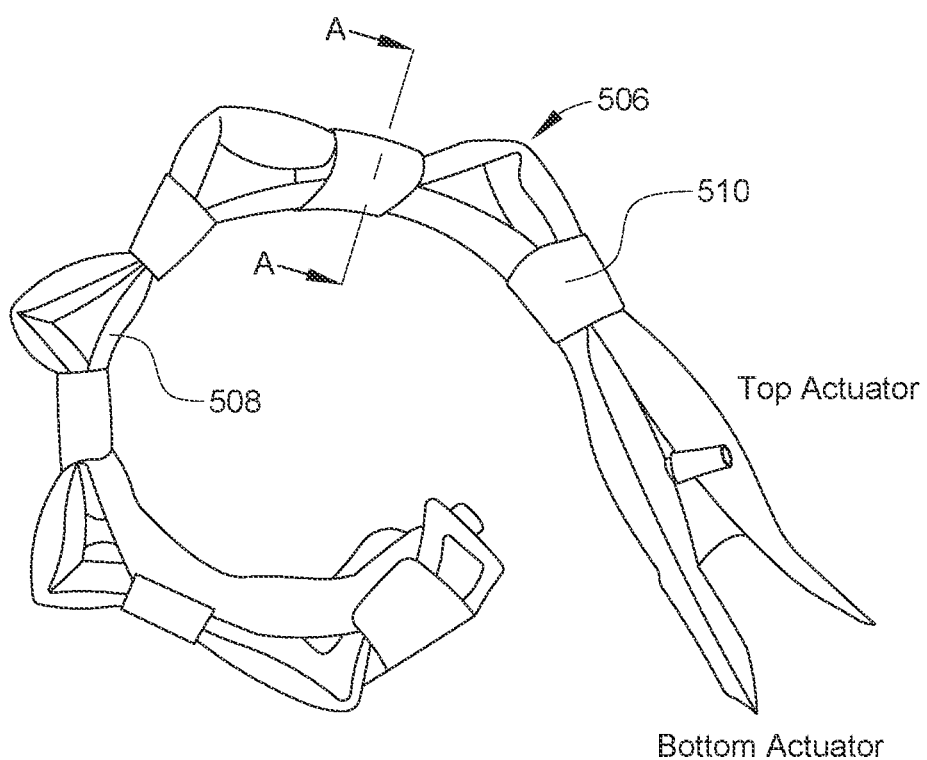
FIG. 6c illustrates a fluid-driven actuator produced from the method of FIGS. 6a and 6b.
Figure 6D:
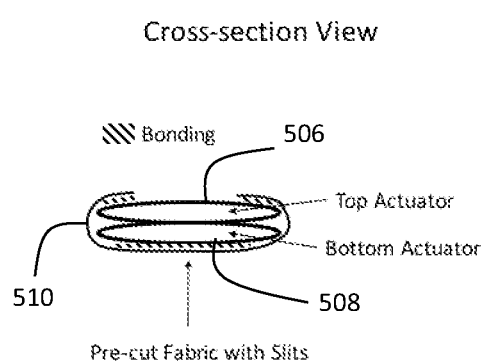
FIG. 6d is a cross-sectional view in direction A-A of the fluid-driven actuator of FIG. 6c.

Going back to FIG. 6a, after the overlapped portions formed by the longer edges of the fabric 502 are sealed, a tube adapter (not shown) is similarly inserted into the tube hole 502 at step 606, and at step 608 the shorter edges of the fabric 500 are sealed as explained in FIG. 7. In this way, an air pocket is created within the fabric 500, and a first air bladder 506 is thus formed. To form a fluid-driven actuator 150, a second air bladder 508 is formed in a similar manner and as can be appreciated from step 610 of FIG. 6b, this second air bladder 508 is slightly shorter than the first air bladder 506. The position of the folds and points of the first air bladder 508 to connect to the second air bladder 508 are marked. In step 612, the first air bladder 506 is folded to form a series of folds 506a and grooves 506b with an undulating profile which similarly forms the bending actuator 200, and the second air bladder 508 forms the restraint member. In this variation, the fluid-driven actuator 150 further includes a pre-cut fabric fastener 510 with pairs of opposing straps 512,514 and each pair of opposing strap 512,154 wraps around the second air bladder 508 and the first air bladder 506 and the straps 512,514 are secured at the respective grooves 506b of the first air bladder 506 through heat bonding/ultrasonic welding. FIG. 6c illustrates the fluid-driven actuator 150 produced from FIGS. 6a and 6b, and FIG. 6d is a cross-section view of the fluid-driven actuator 150 in a direction A-A.

FIG. 8a illustrates the fluid-driven actuator 150 of FIG. 6c in an inactive state, whereas FIG. 8b illustrates the fluid-driven actuator 150 in an active state. It is found that the fluid-driven actuator 150 achieves better performance, high force of actuation and has virtually no air blockage.

To test the performance, the fluid-driven actuator 100 of FIG. 5a is subjected to actuator characterization to determine its bending radius and force/torque output. Specifically, the fluid-driven actuator 100 is characterized in terms of their bend radius, maximum blocked tip force, and resistive grip force upon pressurization.

Figure 9:
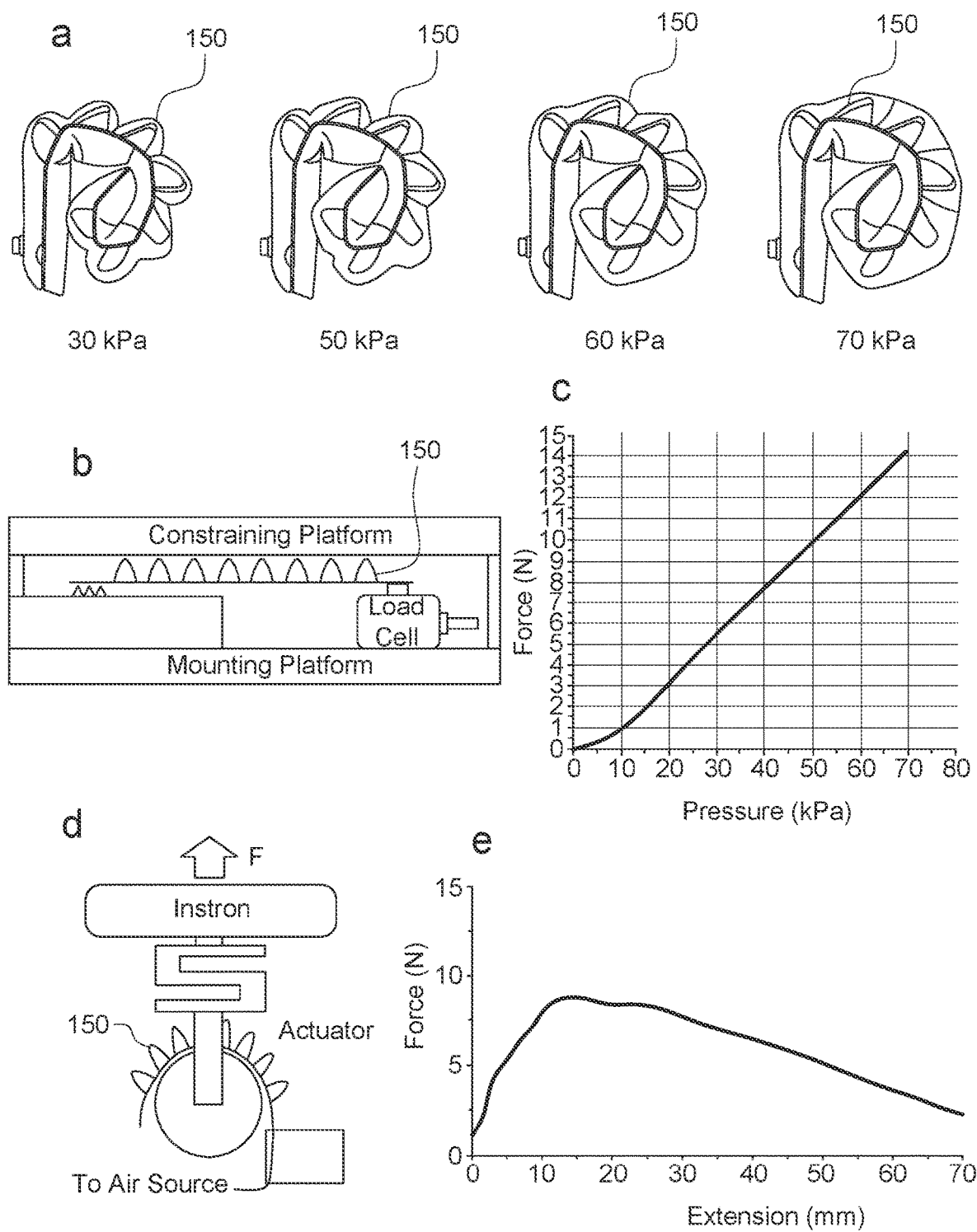
FIG. 9a illustrates exemplary bend radii of the fluid-driven actuator of FIG. 5a at different air pressures.
FIG. 9b is a schematic of a customized force measurement system to measure the maximum blocked tip force exerted by the fluid-driven actuator of FIG. 9a over increasing pressures.
FIG. 9c is a graph illustrating results from the force measurement system of FIG. 9b.
FIG. 9d is a schematic of a force setup apparatus to measure resistive grip force applied by the fluid-driven actuator of FIG. 9a during pressurization.
FIG. 9e is a graph illustrating the results from the force setup apparatus of FIG. 9d.

The bend radius at different pressures was obtained using image analysis software (Image J, National Institute of Health, USA) and normalized to the original length of the actuator. FIG. 9(a) illustrates the fluid-driven actuator 100 of FIG. 5a with varying bend radius at different air pressures—30 kPa, 50 kPa, 60 kPa and 70 kPa. From the results, FIG. 9(a) shows that the fluid-driven actuator reached its minimum bend radius of 0.069±0.003 at 30 kPa. Further increase in pressure did not change the bend radius significantly. This normalized bend radius was smaller than the normalized bend radius of 0.081 achieved by elastomeric actuators developed previously.

The maximum blocked tip force exerted by the fluid-driven actuator 100 is measured over increasing pressures using a customized force measurement setup as illustrated in FIG. 9(b). The system consisted of a compression load cell (FC22, Measurement Specialties Inc, USA) and a mounting platform. The proximal end of the fluid-driven actuator 100 is mounted on the platform and connected to an air source via a connecting tube. The distal end of the fluid-driven actuator is in contact with the load cell. A constraining platform is positioned on top of the fluid-driven actuator 100. During pressurization, the fluid-driven actuator 100 flexed and started to contact with the constraining platform, which constrained the height and the curvature of the fluid-driven actuator. This force measurement setup measured the initial blocked tip force generated by the actuator regardless of the bending angle. The force increased with increased pressure (see graph of FIG. 9c). In the experiment, the maximum force and maximum actuation pressure tested for the fluid-driven actuator 100 were 14.3N and 70 kPa. Compared to the fiber-reinforced actuators which are made from Elastosil M4601 (Shore Hardness 28A) and operates at the pressure range of 275-375 kPa as well as the fabric-reinforced actuators which are made from DragonSkin 10 (Shore Hardness 10A) and operates at the pressure range of 120-160 kP, the fluid-driven actuator 100 of FIG. 5a is able to achieve similar force output at lower pressure.

The resistive grip force applied by the fluid-driven actuator 100 during pressurization is measured using a universal testing machine (Model 3345, Instron, MA, USA), with its schematic shown in FIG. 9(d). The fluid-driven actuator 100 is pressurized to 70 kPa to enclose and grasp a cylinder with table and the cylinder was pulled upward by the Instron at a fixed velocity (8 mm/s) until the cylinder was released from the actuator's grasp. The experiment is repeated three times and the results were averaged and shown in FIG. 9(e). The actuator had a maximum resistive grip force of 8.77±1.62N. Considering a friction coefficient of 0.46, the fluid-driven actuator 100 is able to generate a friction force of 4.03N. Assuming five actuators, with each being able to generate the same amount of grip force, the total friction force to counteract the weight of an object would be 20.15N. As the objects of daily living do not weigh more than 1.5 kg, the friction force was found to be sufficient to lift most of the objects.

Figure 10:
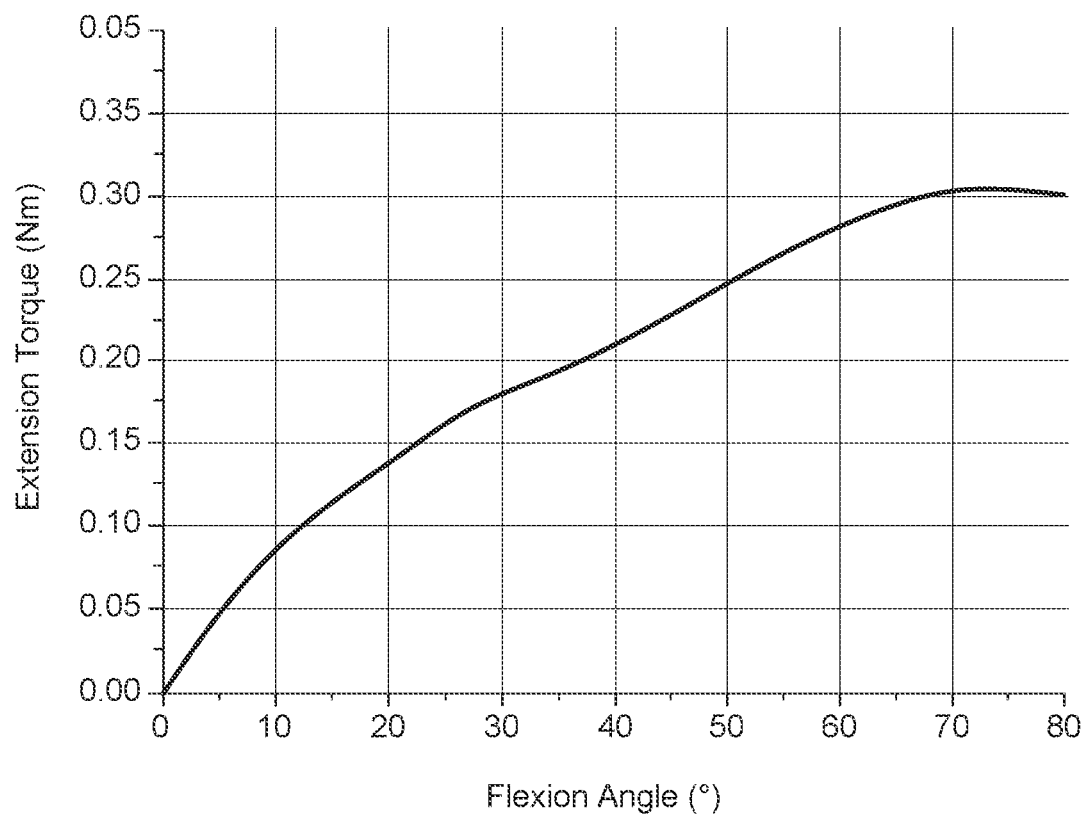

With the extension actuators such as the secondary bladder 302 or the second air bladder 508, the fluid-driven actuators 100,150 can be characterized in terms of their extension torques generated at different flexion angles when they were pressurized at 70 kPa. The torque output is obtained using a customized torque rig with a torque transducer (FT01, Forsentek, China) mounted and using the second air bladder 508 of the fluid-driven actuator 150 of FIG. 8a. The torque rig allowed the measurement of torque output of the second air bladder 508 at different fixed flexion angles and the result is shown in FIG. 10. The torque output increased with increased flexion angle. It was found that the extension actuator is able to generate a maximum extension torque of 0.31 Nm at 70°. Previous studies have quantified the total flexion torque in stroke patients due to spastic finger flexors. The total flexion torque, which is the sum of the flexion torques at the metacarpophalangeal (MCP) joint of four fingers, typically falls within the range of 0.5-4 Nm. Assuming all extension actuators were able to generate same amount of extension torque, the total extension torque achieved by four actuators would be 1.24 Nm, which is able to counteract flexion torque that is smaller than 1.24 Nm and pull the fingers into an open state.

Apart from using TPU-coated fabrics to fabricate the actuator, the fluid-driven actuator 100,150 may be directly casted/molded (industry setting, large scale manufacturing) or 3D-printed (additive manufacturing, small scale prototyping) using polymers such as, but not limited to, Thermoplastic Urethane (TPU), Thermoplastic Elastomer (TPE), Silicone Rubber, to form the folded bladder and sheet-like bladder, and these two other exemplary manufacturing processes would be described next.

B. Casting/Molding (Using Polymers Such as, but not Limited to Thermoplastic Urethane (TPU), Thermoplastic Elastomer (TPE), Silicone Rubber).

FIG. 11a illustrates a first fluid-driven actuator 552 which is shorter than a second fluid-driven actuator 580 illustrated in FIG. 11b, with both actuators being formed by casting or molding. The first fluid-driven actuator 552 has a first actuator body 554 casted using polymer with an integrally formed internal fluid bladder (not shown), and a first actuator base 556 which is laser-cut using a 1 mm thick polypropylene sheet. The first actuator body 554 is further molded with protruding buttons 558 which extend at regular intervals along a longitudinal axis of the first actuator body 554. In this embodiment, there are seven buttons 558, although the first two buttons are closer to each other to hold the distal part of the first actuator body 554 in place. However, it should be appreciated that the distance between the first two buttons may be the same as the rest of the buttons or adjusted depending on the length of the first actuator body 554. At the other end of the first actuator body 554, there is an air inlet connector 560 which is arranged to be coupled to an air inlet 562 (see FIG. 11c) to inject air into the fluid bladder to inflate the first actuator body 554.

The first actuator base 556 functions as a restraint and has seven apertures 564 formed at intervals along the longitudinal first actuator base 556 to correspond to the seven buttons 558 of the first actuator body 554. Each aperture 564 is slightly smaller than the corresponding button 558 so that each button 558 frictionally fits within each aperture 564 and the aperture 564 can secure the respective buttons 558.

The second fluid-driven actuator 580 as illustrated in FIG. 11b is longer as explained above, and in this embodiment, the second fluid-driven actuator 580 has a second actuator body 582 and a second actuator base 584 which is made in a similar manner as the first fluid-driven actuator 580, except that the second actuator body 582 and the second actuator base 584 are longer. In this respect, there are eight buttons 586 on the second actuator body 582 and eight corresponding apertures 588 on the second actuator base 584.

FIG. 12*a* illustrates side views of the second fluid-driven actuator 580 comprising the second actuator body 582 and the second actuator base 584 of FIG. 11*b* and to show the corresponding positions of the buttons 586 and the apertures 588.

To secure the buttons 586 to the apertures 588, the second actuator body 582 is folded to form a plurality of folds 590 to align or register the position of the buttons 586 with the apertures 588 and each button 586 is then inserted snugly through a respective aperture 588, as shown in FIG. 12*b*. In this way, a corrugated second fluid-driven actuator 580 is formed having the internal fluid bladder similar to fluid-driven actuator 100 of FIG. 1 with the second actuator base 584 functioning as restraint member or strain limiting layer.

FIG. 13*a* illustrates the second fluid-driven actuator 580 from another angle in an inactive state, and FIG. 13*b* illustrates the second fluid-driven actuator 580 in an active state, with pressurised air injected into the fluid chamber of the second fluid-driven actuator 580 and the second actuator base 584 cooperating with the second actuator body 582 to cause the second fluid-driven actuator 580 to bend.

It can thus be appreciated that the fluid-driven actuator 100,150 may be directly casted/molded to integrally form the inner fluid bladder and a third exemplary process for making the fluid-driven actuator 100,150 is described next.

C. 3D Printing and Additive Manufacturing (Using Polymers Such as, but not Limited to Thermoplastic Urethane (TPU), Thermoplastic Elastomer (TPE).

The fluid-driven actuator 100,150 may also be 3D-printed (additive manufacturing, small scale prototyping) and in this instance, the fluid-driven actuator 100,150 is 3D printed from a TPU based flexible material, Ninjaflex™' and other flexible filaments for 3D printing may be used.

A 3D printer is set up and controlled via Simplify3D™ slicer software and FIG. 14 is a table to illustrate the settings for the Simplify 3D slicer software to produce a 3D printed fluid-driven actuator 600.

FIG. 15A illustrates a cross sectional view of a 3D printed actuator in the form of a pneumatic actuator 600 similar to the fluid-driven actuator 100,150. As shown in FIG. 15A, the pneumatic actuator 600 has a 3D printed bending actuator 602 having a plurality of folds 604 to form a undulating profile and a 3D printed strain limiting layer 606 functioning as a restraint member and which is fixedly attached to the 3D printed bending actuator 602 at predetermined intervals and a connecting section 608 for an air source. The bending actuator 602 has an integrally formed 3D printed inner bladder or cavity 610 forming a fluid chamber extending along the longitudinal axis of the bending actuator 602 and the inner bladder or cavity 610 follows the undulating profile of the bending actuator 602. The strain limiting layer 606 has a strain limiting inner cavity 612 forming another fluid chamber extending along the longitudinal axis of the strain limiting layer 606. FIG. 15B is an enlarged cross sectional view of portion AA of FIG. 15A to show the inner cavity 610 and strain limiting inner cavity 612 more clearly. FIG. 15C is an enlarged cross sectional view of portion BB of FIG. 15A to show the connecting section 608 more clearly. It should be appreciated that the strain limiting layer 606 may be 3D printed without the strain limiting inner cavity 612.

Similar to the fluid-driven actuators 100,150, pressurization of the inner cavity 610 of the pneumatic actuator 600 allows different profiles of the pneumatic actuator 600 to be achieved.

Figure 16B:
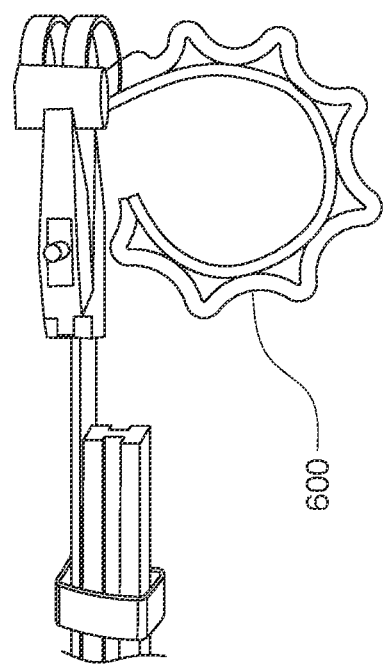
FIG. 16b illustrates the 3D printed pneumatic actuator of FIG. 15A in an active state.
Figure 16A:
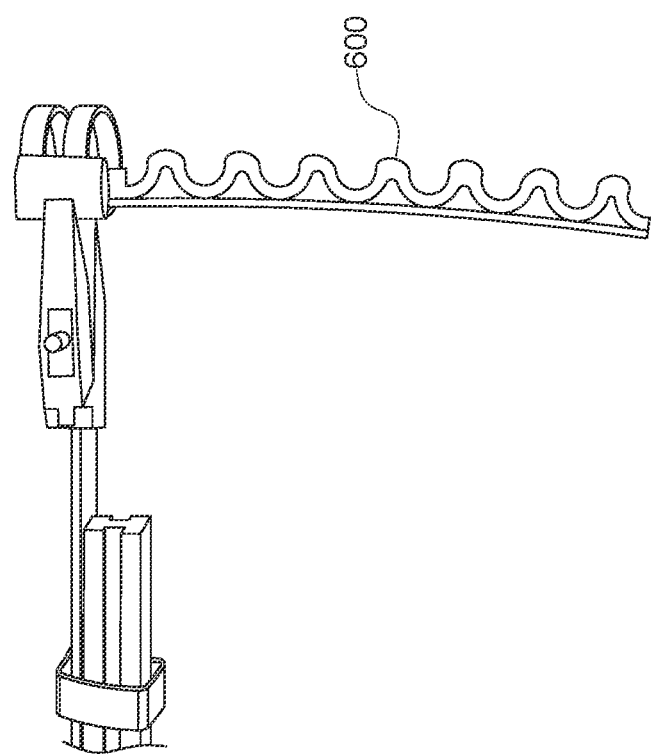
FIG. 16a illustrates the 3D printed pneumatic actuator of FIG. 15A in an inactive state.

Bending—with the strain limiting layer 606 restraining the bladder's expansion, upon pressurization of the inner cavity 610 of the bending actuator 602 (but not the strain limiting inner cavity 612), the bending actuator 602 undergoes expansion at the top whereas the expansion at the bottom is constricted by the strain limiting layer 606, causing a bending profile of the pneumatic actuator 600 to be achieved. If the pressurization is reduced (i.e. pressurized air is sucked out of the inner cavity 610), a straightening profile may be obtained. FIG. 16*a* illustrates the pneumatic actuator 600 in an inactive state (before pressurization) and FIG. 16*b* illustrates the pneumatic actuator 600 in an active state (after pressurization) illustrating the bent profile.

Figure 17B:
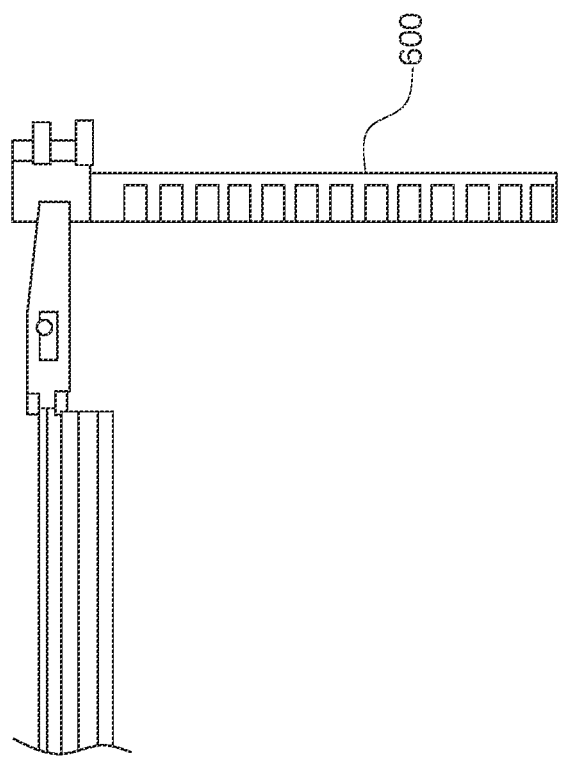
FIGS. 17a and 17b illustrate the pneumatic actuator of FIG. 15A operated between an inactive and an active state respectively to illustrate a twisting action.
Figure 17A:
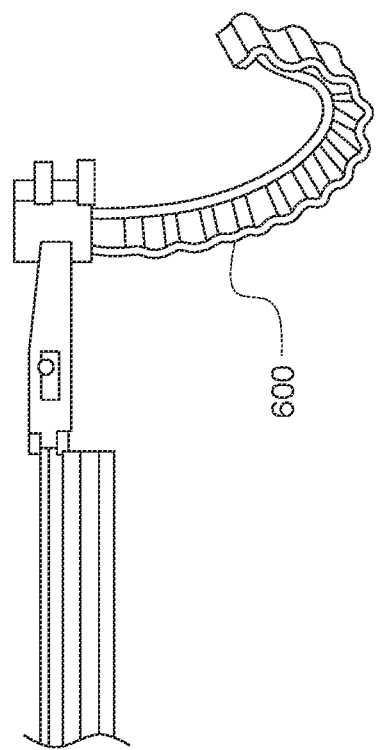

Twisting—the strain limiting layer 606 may be designed to selectively limit the expansion of the bladder 602 upon pressurization so that expansion of the bladder 602 may be limited to one longitudinal side and this causes a twisting profile of the pneumatic actuator 600 to be achieved as shown in FIGS. 17*a* and 17*b*. Specifically, the strain limiting layer 606 is printed at one side of the bottom surface of the bending actuator 602, and this creates an asymmetrical bending profile. When the bending actuator 602 is pressurized, the pneumatic actuator creates both bending and twisting actions.

Figure 18:
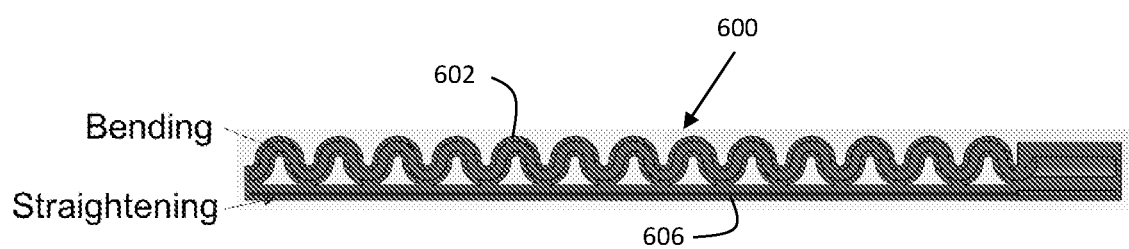
FIG. 18 illustrate the pneumatic actuator of FIG. 15A with the strain limiting layer inflated to straighten the pneumatic actuator.

Straightening—similar to the fluid-driven actuator 100, 150, the strain limiting inner cavity 612 of the strain limiting layer 606 may be inflated with pressurized air and this allows the pneumatic actuator 600 to straighten as shown in FIG. 18.

Applications

The fluid-driven actuator 100,150,600 may be adapted for many applications and a number of exemplary applications will be provided here.

i) Soft Robotic Glove for Assistive, Rehabilitation and Prosthetic Applications

Figure 19:
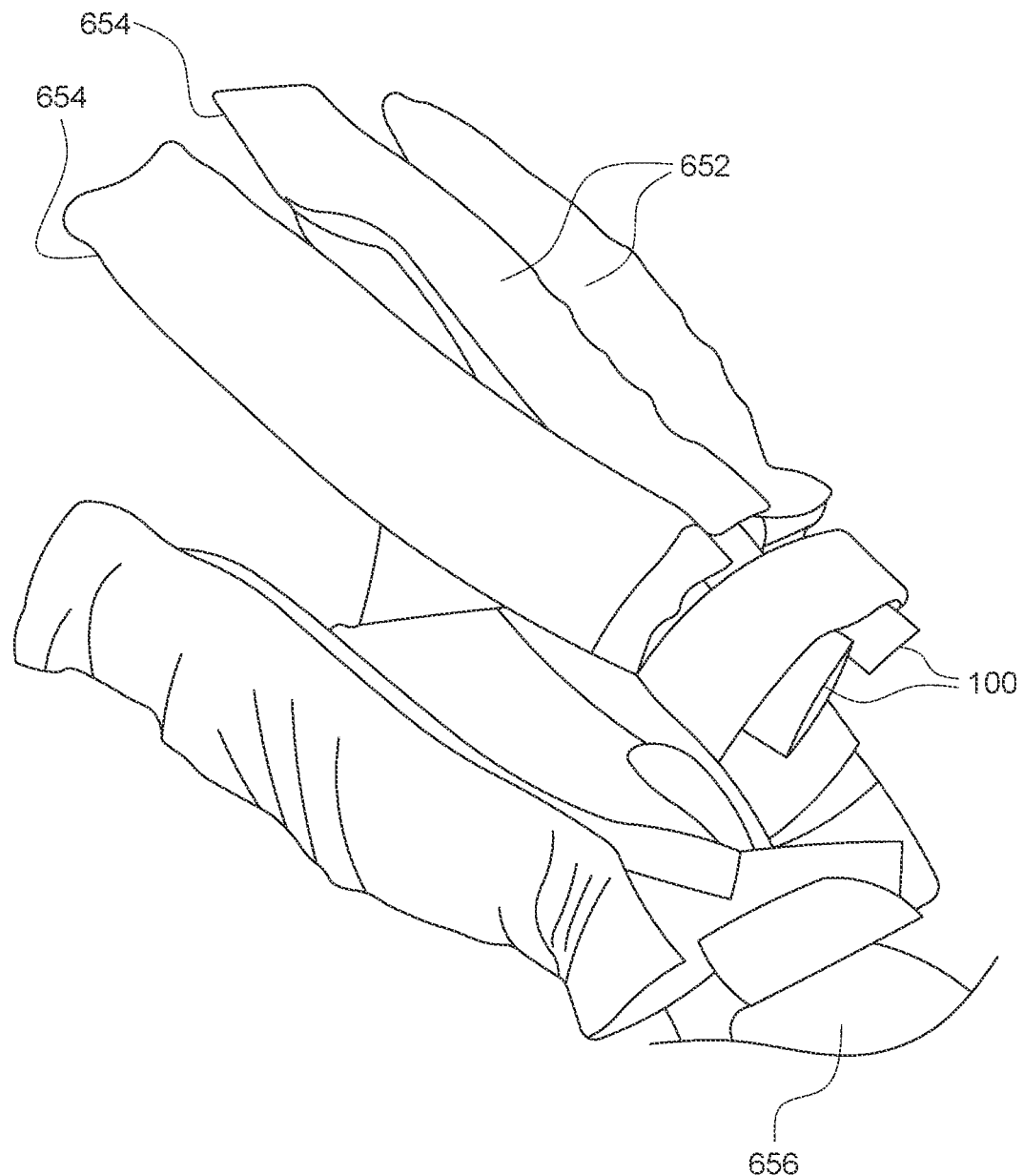
FIG. 19 illustrates a robotic glove comprising at least one fluid-driven actuator of FIG. 1 as an exemplary application.

FIG. 19 illustrates a robotic glove 650 comprising a number of the fluid-driven actuators 100 of FIG. 1. The robotic glove 650 includes five actuator-finger pockets 652 attached to respective dorsal sides of each sheaths 654 for the fingers and the thumb of a human hand 656. The robotic glove 650 serves as a compliant interfacing component to the human hand 656, provides minimal mechanical impedance to the finger motion and allows kinematic transparency when the robotic glove is worn by a user. Open palm design is adopted for easy donning and doffing of the glove, especially for stroke patients with their hands typically clenched.

Figure 20:
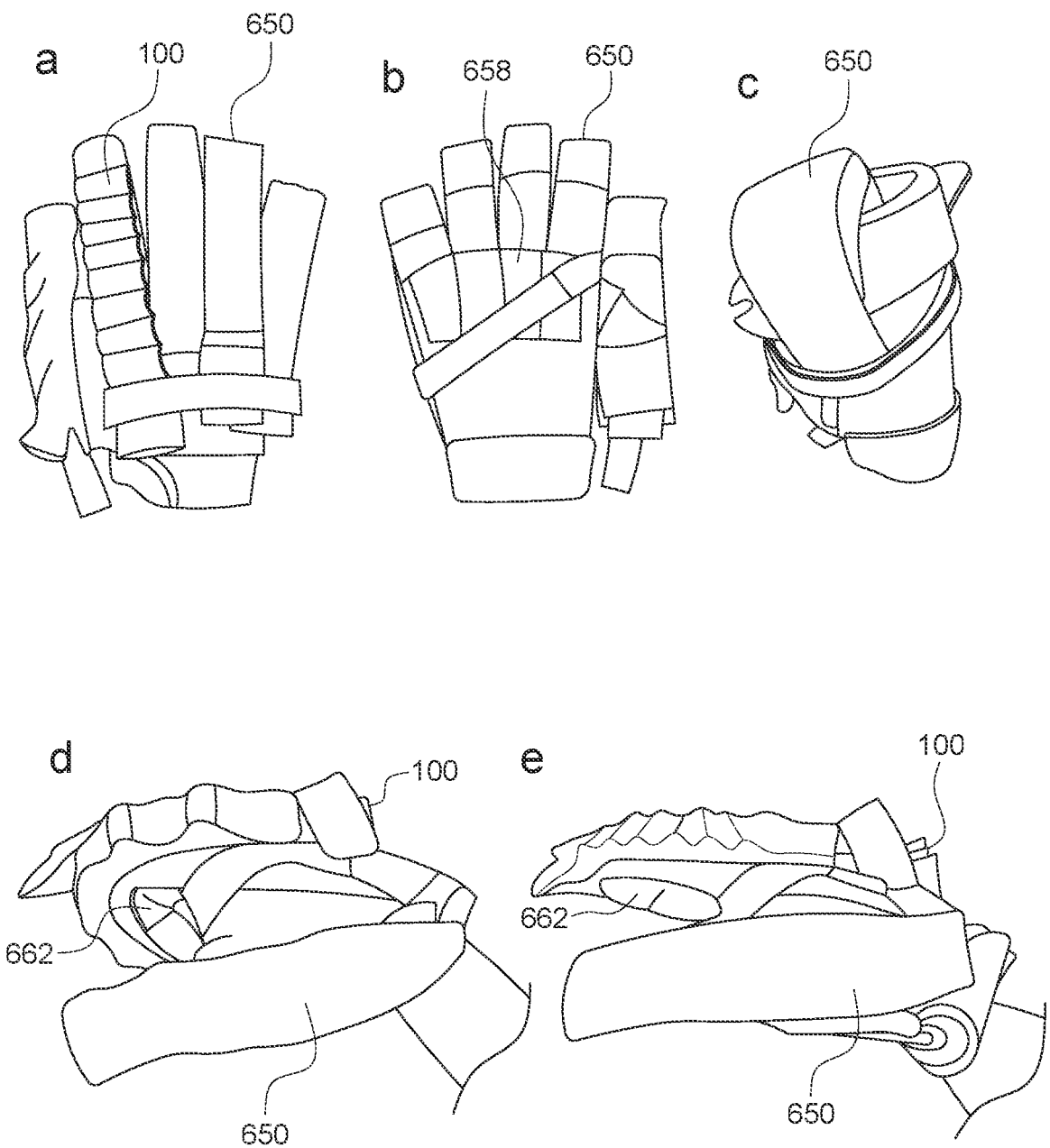
FIG. 20a illustrates one of the actuator-finger pockets of the robotic glove of FIG. 19 removed to show one of the fluid-driven actuators.
FIG. 20b is a palmar view of the robotic glove of FIG. 19.
FIG. 20c illustrates that the robotic glove of FIG. 19 may be folded to reduce its size.
FIG. 20d illustrates one of the fluid-driven actuators being pressurized to flex an index finger.
FIG. 20e illustrates the secondary actuator of the fluid-driven actuator of FIG. 20d being pressurized to extend the index finger.

FIG. 20*a* illustrates one of the actuator-finger pockets 652 of FIG. 19 removed to show one of the fluid-driven actuators 100, which has the bending actuator attached to the secondary actuator. It is possible that the bending actuator may not be attached to the secondary actuator and in this case, the bending actuator may be inserted into the actuator-finger pocket 652 whereas the secondary actuator is separately inserted into an extension actuator pocket 658 formed at the palmar side 660 of the robotic glove 650.

The actuator-finger pockets 652 are made from stretchable lycra fabrics as shown in FIG. 20*b*. Each actuator is isolated with respect to the others, and thus the assistance of each finger can be achieved independently, which allows execution of different grasp and release tasks. In this embodiment, as both the glove 650 and the actuators 100 are made from fabric, the glove can also be folded into a smaller size as shown in FIG. 20c and stored which is difficult to achieve with traditional hand exoskeleton.

Since it is possible to achieve a fully fabric-based robotic glove 650, the total weight of the glove may be reduced considerably (eg. approximately 99 g). Additionally, inflation of the actuators 100 does not add significant amount of extra weight to the hand as they work under air pressure. FIG. 20d illustrates the index finger 662 being flexed or bent due to pressurization of the corresponding fluid-driven actuator 100, and FIG. 20e shows the index finger 662 being straightened due to pressurization of the secondary actuator (i.e. extension actuator) of the fluid-driven actuator 100.

An optical-based motion analysis system with eight cameras (Vicon Motion System Ltd., UK) is used to capture the maximum range of motion of the robotic glove 650 to assist the movement of fingers of a healthy subject. Reflective markers were attached to the robotic glove 650 and motion profiles of the index finger and thumb are tracked. The reflective markers are attached to the index finger at locations corresponding to the fingertip, distal interphalangeal (DIP), proximal interphalangeal (PIP) and MCP joints. For the thumb, the reflective markers are attached to IP, MCP, and CMC joints. The fluid-driven actuators are next pressurized at 70 kPa. For the index finger, the mean peak flexion angles for DIP, PIP and MCP are measured to be 47.7±8.1°, 89.8±4.4°, and 75.3±3.6° respectively. For the thumb, the mean peak flexion angles for IP, MCP and CMC were 34.0±5.5°, 48.7±4.8°, and 56.0±2.1° respectively.

Figure 21:
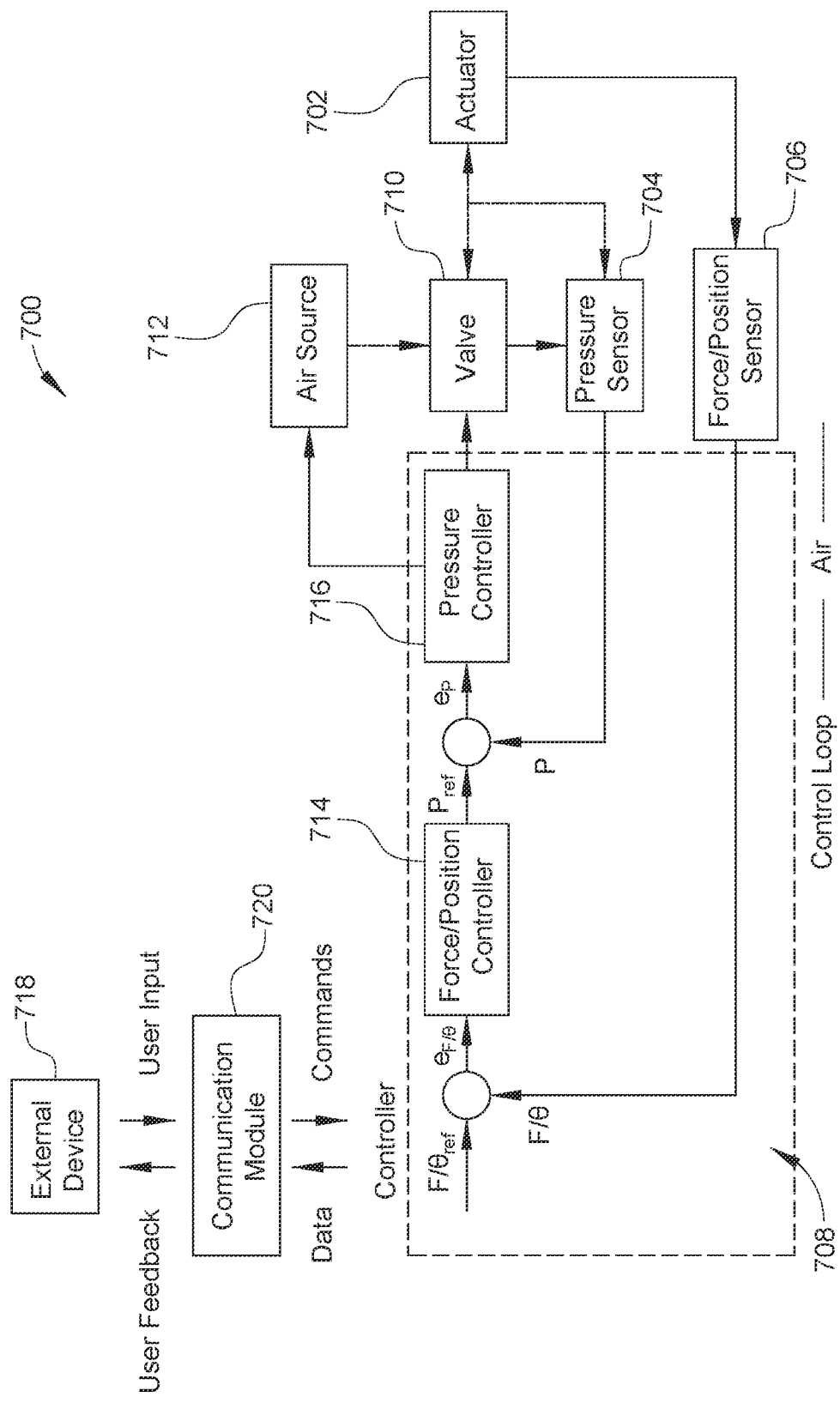
FIG. 21 is a schematic block diagram of an electro-pneumatic control system arranged to control the fluid-driven actuator used in the robotic glove of FIG. 19.

An electro-pneumatic control system 700 is used to control the robotic glove 650, and specifically actuation of each fluid-driven actuator 100 of the robotic glove 650 to allow isolated control of each fluid-driven actuator 100. FIG. 21 is a schematic block diagram of the electro-pneumatic control system 700 arranged to control one actuator 702 as an exemplary fluid-driven actuator 100 for ease of explanation. The actuator 702 includes a pressure sensor 704 (eg. MPX5500DP, Freescale, USA) for detecting and regulating amount of pressurized air within the air bladder of the actuator 702 and is arranged to generated a measured pressure signal P. The robotic glove 650 also includes a force/position sensor 706 disposed on the sheath of the finger associated with the actuator 702 to detect the position or movement of the finger, and is arranged to generate a measured force signal F/θ.

The electro-pneumatic control system 700 includes a controller 708 (eg. Arduino Mega, Arduino) for controlling a miniature solenoid valve 710 (eg. VQ110U, SMC, Japan; Extension Actuators: X-Valve, Parker, USA) and a miniature diaphragm pneumatic pump/air source 712 (eg. D737-23-01, Parker, USA). The controller 700 includes a force/position controller 714 and is arranged to receive a control position signal $e_{F/\theta}$ in response to a force reference signal $F/\theta_{ref}$ and the measured force signal F/θ from the force/position sensor 706. Based on the $e_{F/\theta}$ signal, the force/position controller 714 is arranged to generate a desired air pressure signal $P_{ref}$ which is summed with the measured pressure signal P from the pressure sensor 704 to generate a pressure control signal $e_p$ for a pressure controller 716. The pressure controller 716 then generates a pulse width modulation (PWM) signal to control the pneumatic pump/air source 712 and the valve 710 to regulate the amount of pressurized air to supply into the actuator 702. Broadly, the readings from the pressure sensor 704 is used by the controller 700 to control the activation and deactivation of the valve 710 and the pneumatic pump 712 to achieve the desired air pressure in the actuator 702 in order to produce a desired movement of the actuator 702.

In this embodiment, the electro-pneumatic control system 700 further includes a user control device 718 which may be a computing device (eg. server, laptop, computer, smart phone etc) having a communication module 720 for communicating with the controller 708. The communication may be wired communication or wireless communication such as Bluetooth or via the internet or cloud, for example if a doctor is sending commands remotely to control the controller 708.

Figure 22:
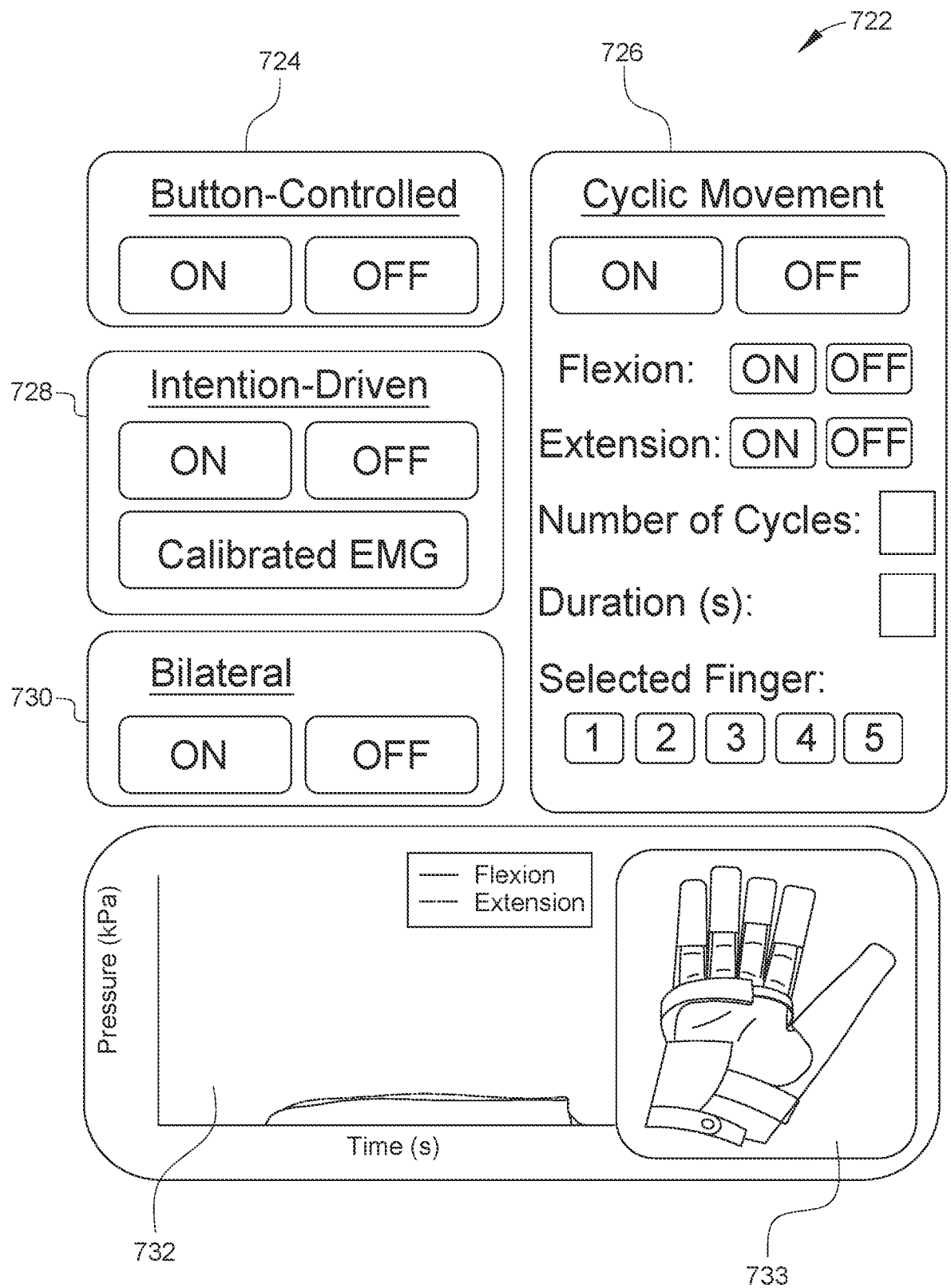
FIG. 22 is a GUI of a customized software application as part of a user control device to control the fluid-driven actuator of FIG. 21.

The user control device 718 includes a customized software application with a GUI 722, as illustrated in FIG. 22, which allows the users, such as the patients and caregivers, to select their desired rehabilitation program and control mode. In this embodiment, four exemplary control modes for the robotic glove 650 are presented, and these include:
  (i) button-controlled assistance mode 724;
  (ii) cyclic movement training mode 726;
  (iii) intention-driven task-specific training mode 728 with electromyography sensors; and
  (iv) bilateral rehabilitation training mode 730 with data glove. Additionally, a graph panel 732 is provided real time graphical illustration of the sensor values, such as pressure sensor value as well as real time video 733 of the selected exercise.

(i) Button-Controlled Assistance Mode

Figure 23:
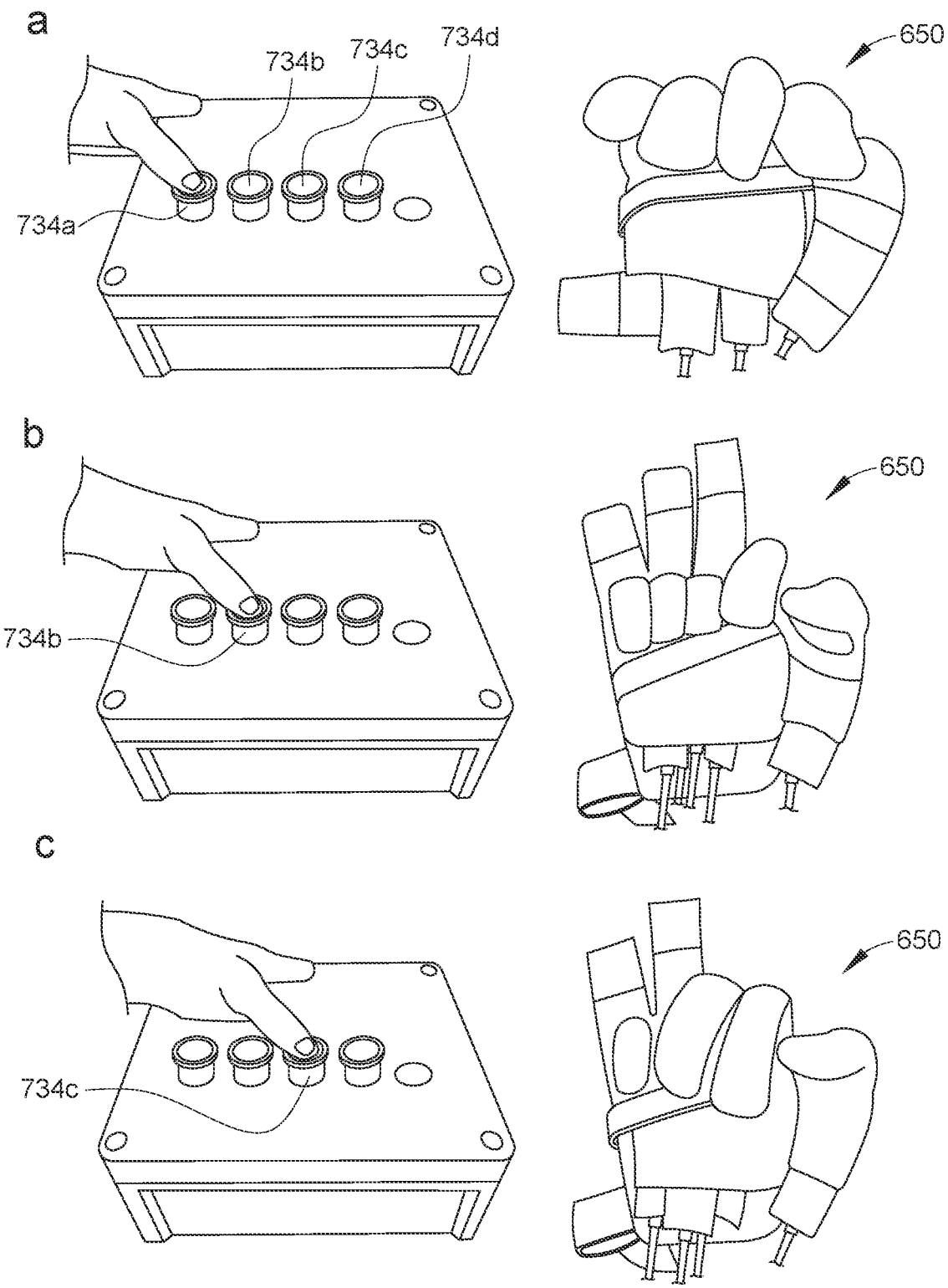
FIGS. 23a, 23b and 23c illustrate a button system having a plurality of buttons which may be depressed by a user to control the actuation of the fluid-driven actuator of FIG. 21.

In this control mode, the user control device 718 further includes a set of manual buttons 734a,734b,734c,734d as illustrated in FIGS. 23a, 23b and 23c. The manual buttons 734a,734b,734c,734d are communicatively coupled to the controller 708 and this mode provides the most straightforward control method to control the robotic glove 650, without any complicated algorithm. This control mode is particularly suitable for assistive applications, such as assisting patients with their ADLs. A patient is able to depress the physical manual buttons 734a,734b,734c,734d using his non-paretic hand in order to activate the robotic glove 650. The assisted-hand motions can be preprogrammed or hard coded. FIGS. 22a, 22b and 22c show three preprogrammed assisted-hand motions, which are power grip, pinch grip, and tripod pinch grip respectively. It is envisaged that these manual buttons 734a,734b,734c,734d may be further integrated with a wheelchair so that wheelchair-bound users, such as patients with spinal cord injury, are able to use the robotic glove to assist them in their ADLs.

(ii) Cyclic Movement Training Mode

The GUI 722 is also preprogrammed for cyclic movement training mode 726, for example, cyclical stretching that involves repeated hand closing and opening. Passive cyclical stretching, combining with active repeated task practice, has shown therapeutic effects on clinical task performances and impairment measures for stroke patient with substantial upper extremity impairment. This control strategy allows cyclic movement training of different tasks, such as hand grasping and pinching. In this control mode, the fluid-driven actuators 100, and in particular the flexion and extension actions, are sequentially activated by software and assist the bidirectional finger flexion and extension. Additionally, the flexion or extension assistances can be selectively turned off depending on the patient's condition. For example, for stroke patients that have the residual ability to voluntarily flex their fingers, the flexion assistance can be turned off so that only extension assistance is provided to open their hands while allowing them to close their hands voluntarily.

(iii) Intention-Driven Task-Specific Training Mode—EMG

Figure 24:
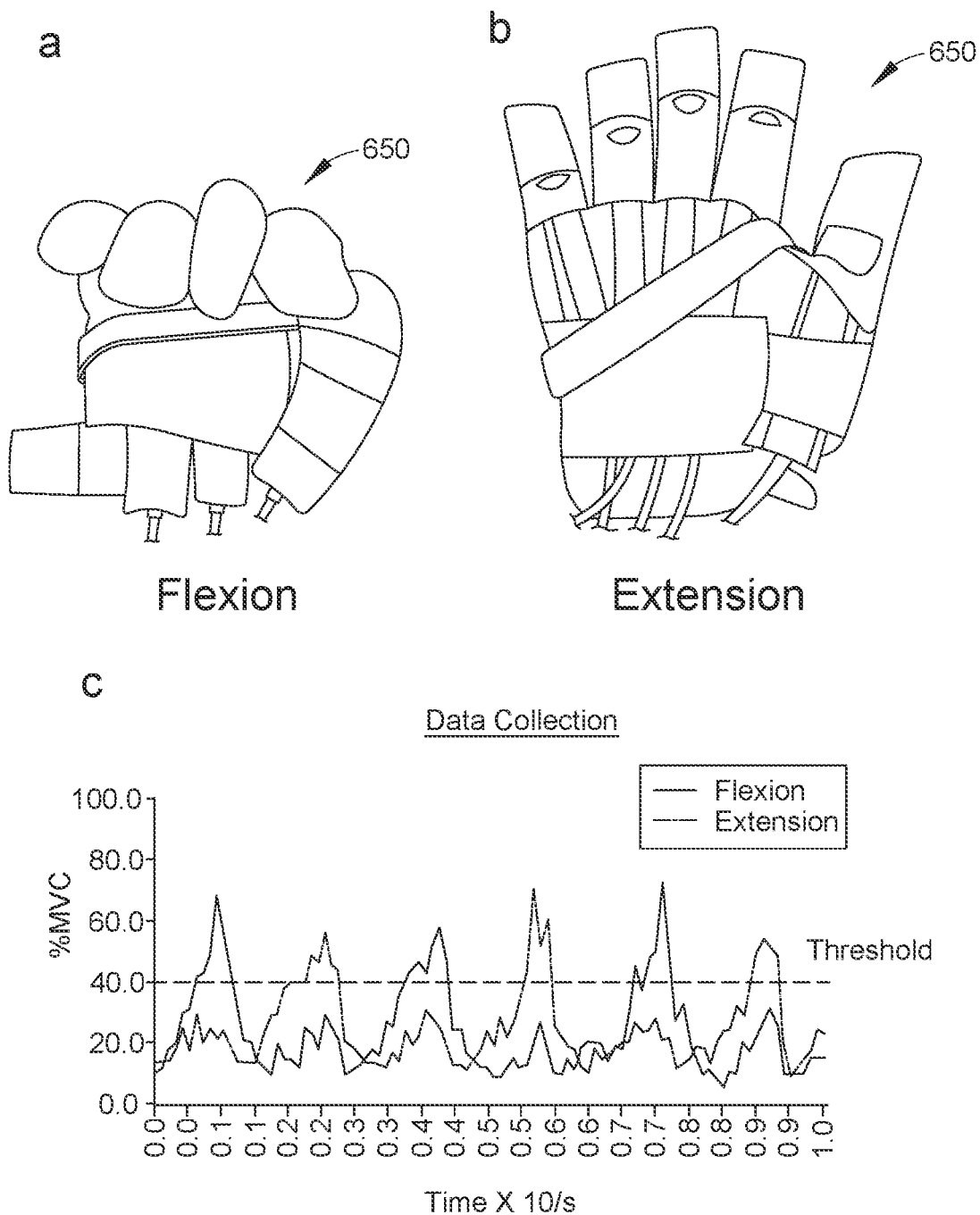

In this intention-driven strategy, an open-loop EMG logic is adopted to detect the user intent with two EMG sensors. The control of the robotic glove 650 is achieved by monitoring the state of the muscle signals at the finger flexors and the finger extensors to three conditions: i) 'activate', ii) 'hold', and iii) 'release'. The 'activate' condition is met when the muscle signal from the finger flexors exceeds the flexor threshold. In this condition, the pre-selected group of fluid-driven actuators 100 is pressurized, flexing the fingers as shown in FIG. 24*a*. The 'release' condition is met when the muscle signal from the finger extensors exceeds the extensor threshold. In this condition, the fluid-driven actuators 100 would be pressurized to straighten as shown in FIG. 24*b* and the bending actuators is depressurized. The fingers would be returned to the extended position. The 'hold' condition is activated when both the 'activate' and 'release' conditions are not met. The actuators will maintain the present condition until the next condition is met. The threshold may be adjusted based on the pathology and residual muscle activity of the user. The user may be required to perform maximum voluntary contraction (MVC), which can be obtained through the GUI 722. FIG. 24*c* shows the muscle signals collected from finger flexors and extensors during the power grip, alongside their corresponding thresholds (which was 40% of FLEXORS-MVC and EXTENSORS-MVC for the particular participant).

(iv) Bilateral Rehabilitation Training Mode

In this control mode, the user attempts to perform bimanual ADL tasks simultaneously. It has been found that bimanual therapy is able to promote functional motor recovery with improved upper limb movement coordination and synchronization. A data glove 736 with ability to track the hand kinematics through five individual flex sensors 738 (eg. FS, Spectra Symbol, USA) is worn on the non-paretic hand as shown in FIG. 25*a* in order to detect the voluntary movements of the non-paretic hand and activate the robotic glove 650 on the paretic hand as shown in FIG. 25*b*, simulating the mirror therapy typically used in stroke rehabilitation. In FIG. 25*b*, there three sets of drawings illustrate the user activating the robotic glove 650 with different assisted hand motions via the data glove 736, such as power grip, pinch grip, and full grasp respectively.

It should be appreciated that the GUI 722 may be implemented via a customized smart phone application (app) as part of the user control device 718. The app may communicate wirelessly (Bluetooth or Wi-Fi) with the controller 708 and the sensor data may be fed to the smart phone or cloud-shared to a server.

Apart from being an assistive device, the robotic glove may be used as a prosthetic application, and the robotic glove may be configured to hold and lift objects with different diameters and weights.

Figure 26:
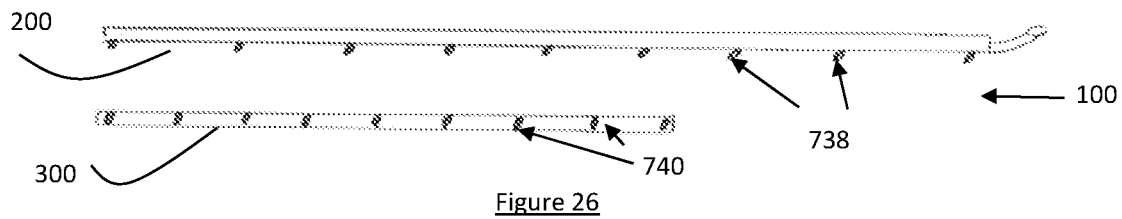
FIGS. 26 and 27 illustrate how the corrugation or undulating profile of a bending actuator of the fluid-driven actuator may be adjusted or customized.

As it can be appreciated from the described embodiment, with the fluid-driven actuator 100 having a bending actuator 200 with an integrally formed inner fluid bladder 202, there is greater freedom to manufacture the actuator 100 and in particular, the bending actuator 200 may be fabricated as a straight piece, with actuator locking mechanisms 738, as shown in FIG. 26. The restraint member 300 or substrate is thus provided with corresponding restraint member locking mechanisms 740 as well (see FIG. 26), and users may adjust or customise the folds 742 of the actuator 100 according to their desired bending profiles and secure the folds via the locking mechanisms as shown in FIG. 27.

Figure 27:
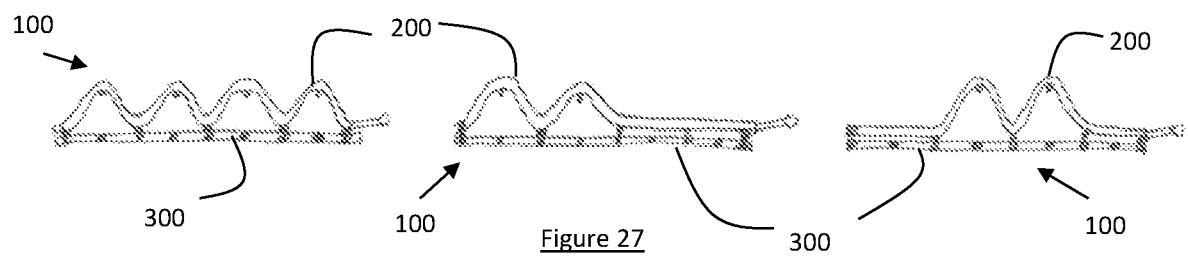
Figure 28:
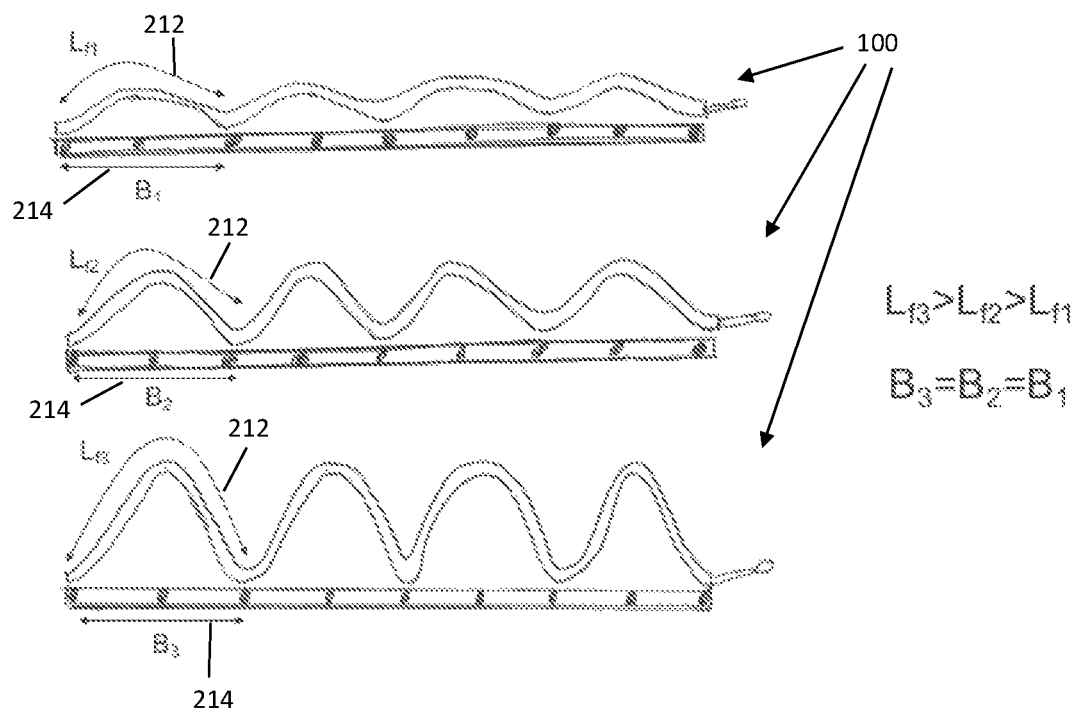
FIG. 28 illustrates a relationship between fold length and fold width of a fold of the corrugated bending actuator of FIGS. 26 and 27.

FIG. 28 illustrates the relationship between the fold length 212 and the fold width 214, and the various fold length 214 is represented as Lf3, Lf2 and Lf1 in FIG. 27, whereas the fold width 214 is fixed with B3=B2=B1. With the fold length 214 fixed, and the fold lengths 212 increased, the actuator 100 would bend more (bending radius curvature decreases) and create a larger force.

Figure 29A:
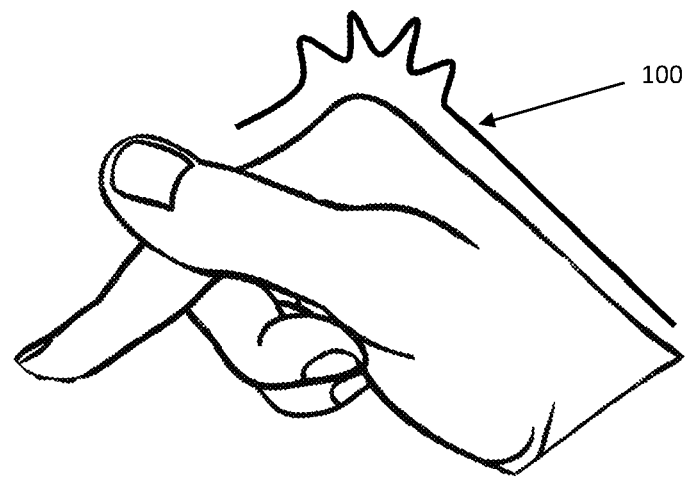
FIGS. 29a and 29b illustrate two exemplary applications of being able to customize the corrugated bending actuator of FIGS. 26 and 27.
Figure 29B:
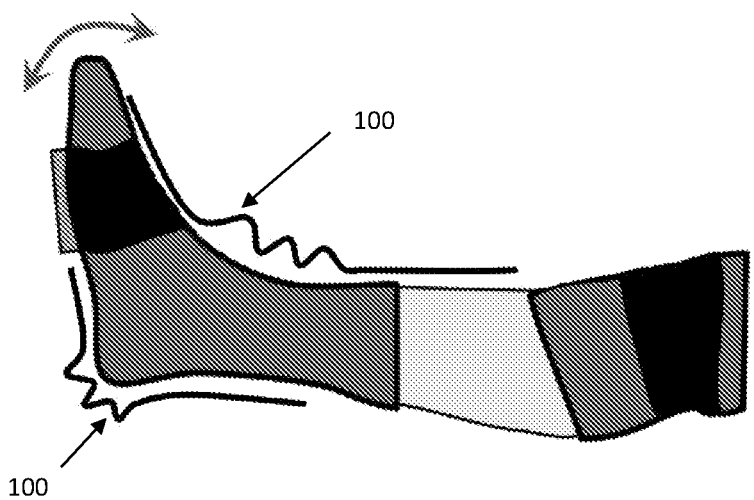

With the advantages of customizable bending profiles, the actuator 100 may thus achieve desired actuation at targeted joint location, for example the MCP finger joint and ankle joint shown in FIGS. 29*a* and 29*b* respectively.

Figure 30:
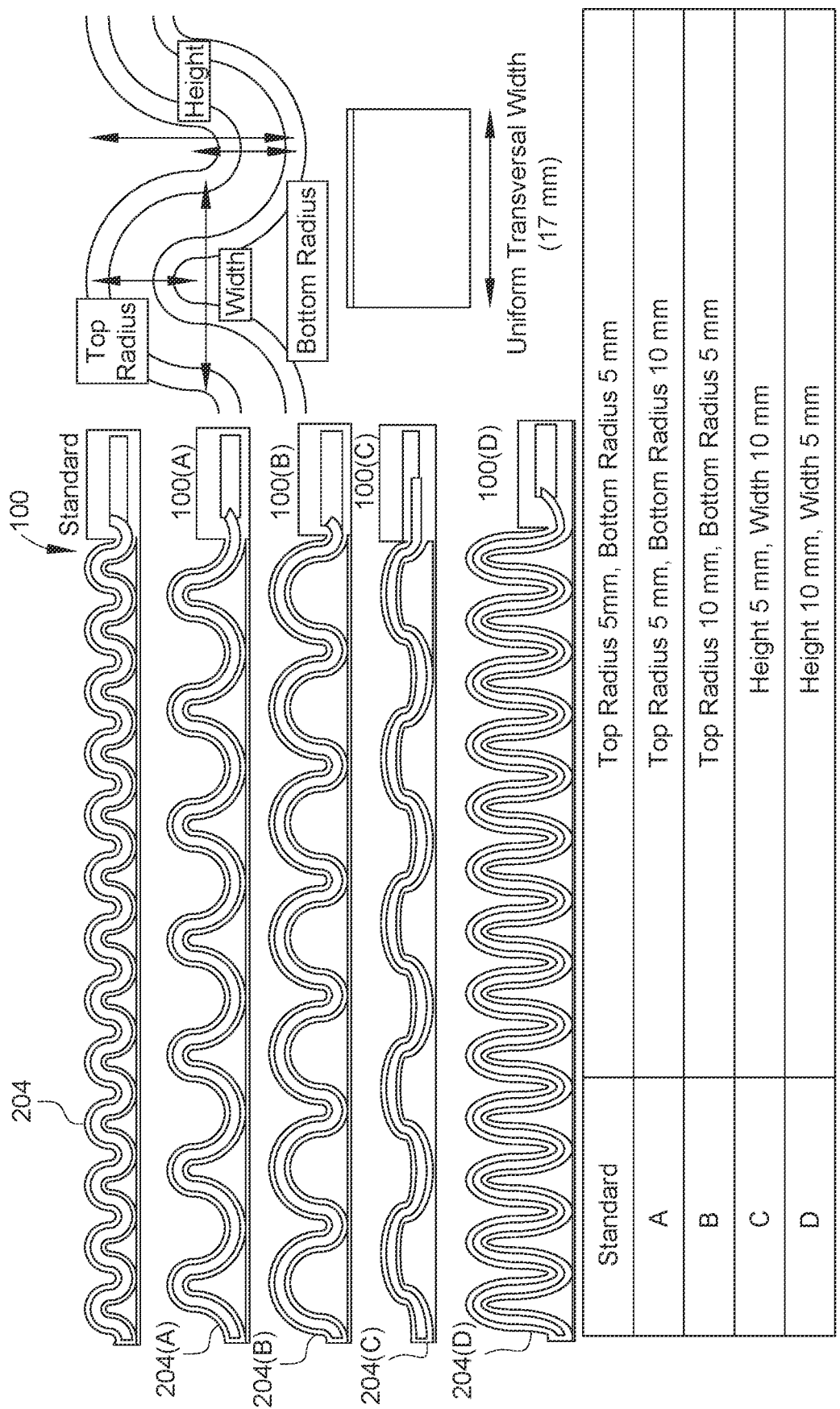
FIG. 30 illustrates the fluid-driven actuator of FIG. 1 having different types of folds for the corrugated bending actuator.

Indeed, the described embodiment should not be considered as limitative and there are other variations and possibilities. For example, while it is preferred, the inner fluid bladder 202 may not be integrally formed with the bending actuator 200. Also, the folds 204 of the air bladder 200 may be varied and have different dimensions and sizes, such as that illustrated in FIG. 30 which shows five different fluid-driven actuators 100(standard), 100(A), 100(B), 100(C) and 100(D) with different fold dimensions 204(standard), 204(A), 204(B), 204(C) and 204(D).

Figure 31:
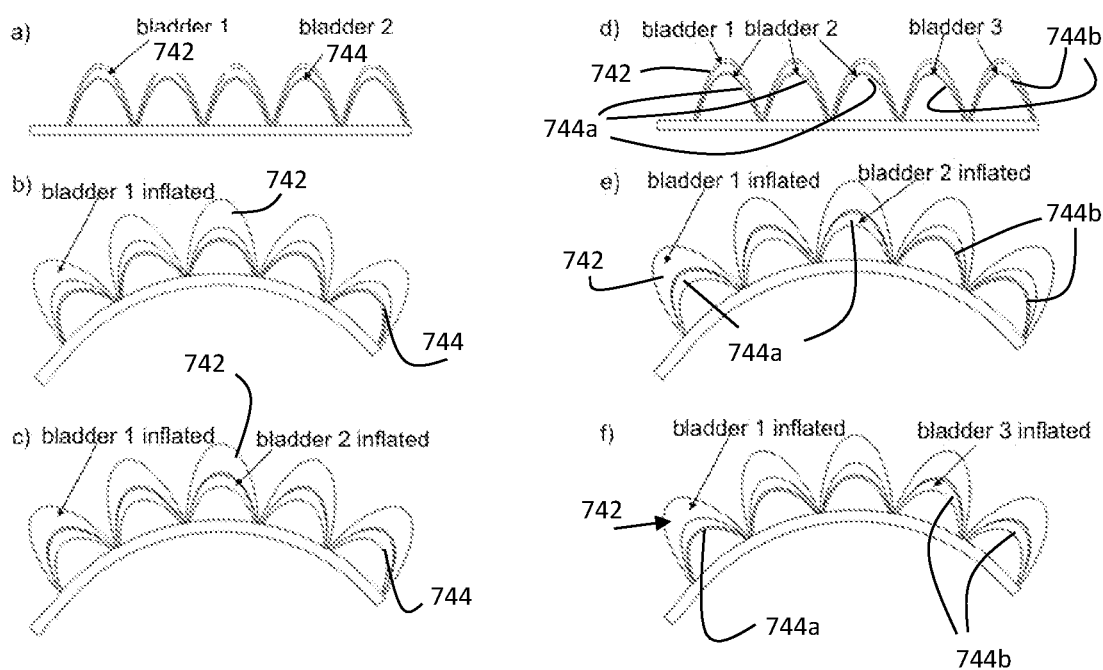
FIGS. 31a to 31f illustrate the effects of having a multi-layer folding in the fluid-driven actuator of FIG. 1.

Further, the fluid-driven actuator 100 may be produced with multilayer folding such as that illustrated in FIG. 31*a*. In FIG. 31*a*, the fluid-driven actuator 100 includes a first corrugated air bladder 742 and a second corrugated air bladder 744 which is aligned with the same corrugation or folds as the first corrugated air bladder. The first corrugated air bladder 742 and the second corrugated air bladder 744 may thus be inflated or expanded independently to achieve different stiffness at selected segments. For example, when the first corrugated air bladder 742 is inflated (but not the second corrugated air bladder 744), the fluid-driven actuator 100 would form a concave bending shape as shown in FIG. 31*b*. When the second corrugated air bladder 744 is actuated, the bending force is enhanced as illustrated in FIG. 31*c* (although the shape may not change much).

Also, the first and second corrugated air bladders 742,744 may be structured differently to create different bending forces at different segments of the fluid-driven actuator 100. For example, the second corrugated air bladder 744 may be formed with two air segments 744*a*,744*b* which are independently inflatable as shown in FIG. 31*d*. To create a larger bending force near the first air segment 744*a*, the first corrugated air bladder 742 is inflated together with the first air segment 744*a* of the second corrugated air bladder 744 (but not the second air segment 744*b*) as shown in FIG. 31*e*. On the other hand, inflating the second air segment 744*b* at the same time, this creates a larger bending force in the second corrugated air bladder 744 as shown in FIG. 31*f*. With such an arrangement, selected segments may be actuated to create a larger bending force at desired positions, while not changing the force at other positions. This may be particularly useful when the actuator 100 is used for rehabilitation, where some joints require a larger force to bend than the other joints. Thus, the fluid-driven actuator 100 maybe adapted according to the actual needs.

Figure 32A:
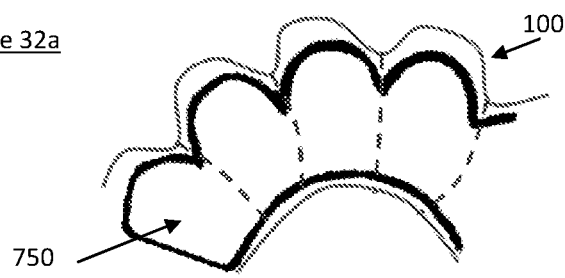
FIGS. 32a to 32c illustrate effects of combining the fluid-driven actuator of FIG. 1 with a conventional bellow-type actuator.

The fluid-driven actuator 100 may be combined with a conventional bellow type actuator 750 to enhance the bending and bending force of the bellow-type actuator, as shown in the FIG. 32*a*. For such an application, the fluid-driven actuator 100 is uniformly folded and wrapped around the bellow-type actuator and secured to the restraint member at selected joints to enhance the bending force when both actuators are pressurized together. It is envisaged that the bending profile and bending force of the combined actuators can be actively adjusted by adjusting the pressure inside the two individual actuators 100,750.

Figure 32B:
Figure 32C:
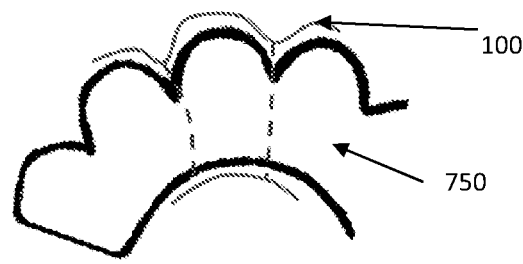

Similarly, the fluid-driven actuator 100 may be actuated at specific segments such as that described above in relation to FIGS. 31*d* to 31*f*, then selected portions would benefit from a higher force such as the distal and central portions as illustrated in FIGS. 32b and 32c.

Incorporating multiple fluid-driven actuators 100 can create motions with multi degrees of freedom (DOF). For example, FIGS. 33a to 33d show how two fluid-driven actuators 752,754 being secured to a common restraint member 756 can create three bending motions as depicted by bending arrows A, B and C. Based on this understanding, the fluid-driven actuator 100 may thus be adapted for a human arm, and this would be further elaborated below.

Figure 33A:
FIGS. 33a to 33d show how two fluid-driven actuators of FIG. 1 may be secured to a common restraint member to create different bending motions.
Figure 33B:
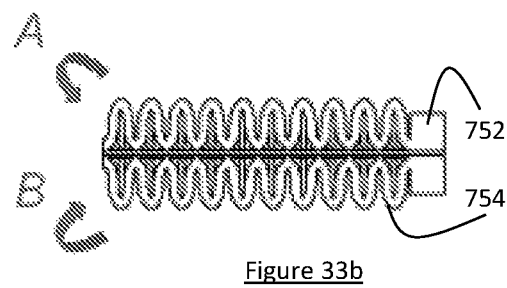
Figure 33C:
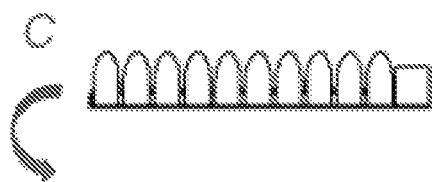
Figure 33D:
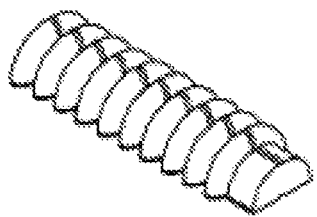
Figure 33E:
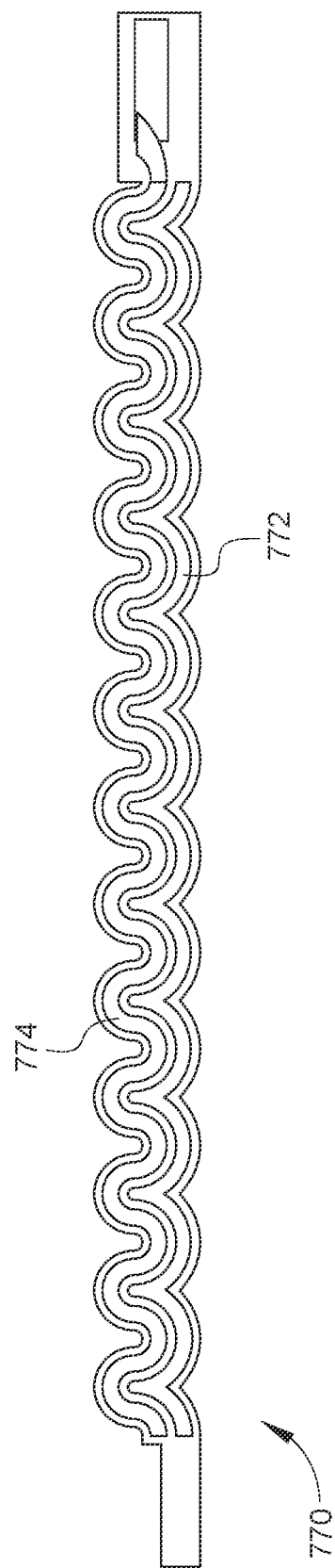
FIG. 33e shows a variation of a pneumatic actuator of FIG. 18.

FIG. 33e illustrates a pneumatic actuator 770 similar to the pneumatic actuator 600 of FIG. 18 but having a strain limiting layer 772 adapted to follow the undulating profile of a bending actuator 774, unlike the strain limiting layer 606 of FIG. 18 which is straight. Thus, it should be appreciated that the strain limiting layer 606,772 may adopt other forms/shapes apart from a straight profile. Also, the strain limiting layer 606,772 may be sensorized. i.e. incorporate with sensors such as flex sensors.

Figure 34:
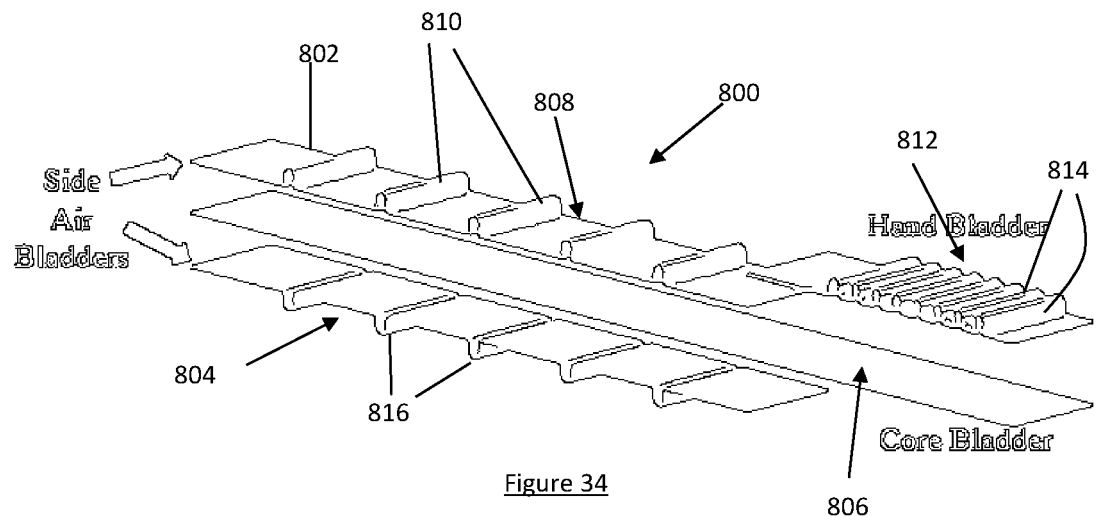
FIG. 34 is an exploded view an arm fluid-driven actuator based on the working principles of the fluid-driven actuator of FIG. 1.

FIG. 34 is an exploded view of an arm fluid-driven actuator 800 having an upper corrugated bending actuator 802, a lower corrugated bending actuator 804 and a restraint member 806 sandwiched between the upper and lower corrugated bending actuators 802,804. In this example, the restraint member 806 has an inner air cavity (not shown) similar to the secondary bladder. The upper corrugated bending actuator 802 includes an arm segment 808 having arm segment folds 810, and a hand segment 812 having hand segment folds 814 which are closer together than the arm segment folds 810. The lower corrugated bending actuator 804 includes lower arm segment folds 816 in opposing relationships but in registration with the arm segment folds 810 of the arm segment 808 of the upper corrugated bending actuator 802.

In other words, the main difference between the arm segment 808 and the hand segment 812 is the spacing of folds 810,814. For the arm, continuous bending modality with proper bending angle is preferred, and thus, the spacing between two adjacent folds 810 is relatively large, compared with distance between adjacent folds 814 of the hand segment 812. In this way, the folds 810 can hardly affect each other and over bending of one joint is prevented. For the hand segment 812, large bending angle is preferred to achieve grabbing motions of a human hand. Thus, the spacing between the folds 814 is small and there are more amounts of folds 814. The folds 814 can interact with adjacent folds 814, so the bending force is larger.

The restraint member 806 is used to maintain stiffness of the robotic arm, and it can also help release the hand segment 812 from a grabbing motion. By using different heights, widths and spacing of the folds 810,814,816, different bending modalities may be achieved. An example of the parameters of the arm fluid-driven actuator 800 of FIG. 34 is provided in Table 1 below:

TABLE 1

| | Length | Fold Length | Fold Width | Fold Spacing | No. of Folds |
| --- | --- | --- | --- | --- | --- |
| Arm segment | 55 cm | 3 cm | 1 cm | 8 cm | 5 |
| Hand segment | 25 cm | 3 cm | 1 cm | 1 cm | 8 |

With the arrangement of FIG. 34, it is possible to create a robotic arm 850 using the arm fluid-driven actuator 800 which has several degrees of Freedom (DoF), including bending in two directions and grabbing an object. The bending motion and grabbing motion of the robotic arm 850 are similar in the sense of mechanism. Thus, the key point of designing the robotic arm 850 is to make bending actuation of various degrees, namely small bending curvature at arm section and large bending curvature at hand section.

Figure 35:
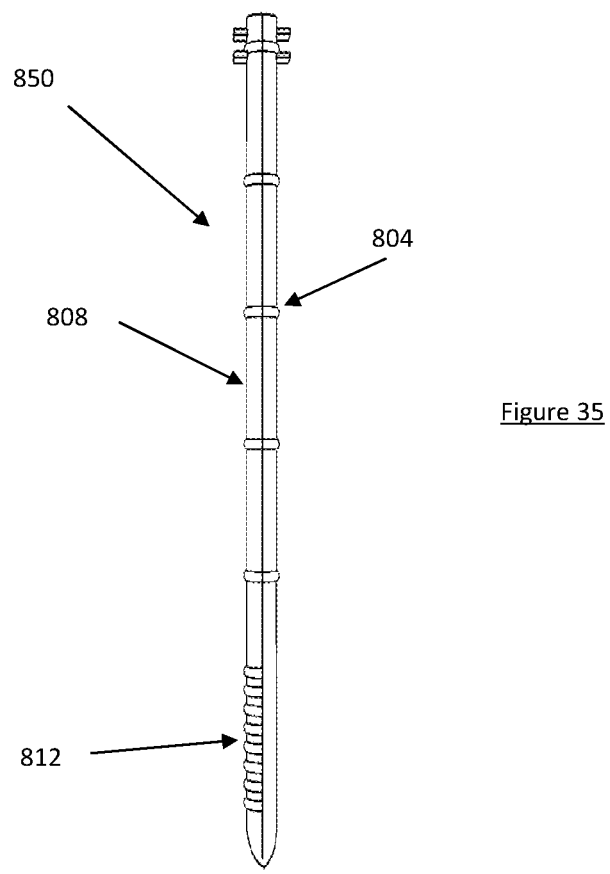
FIG. 35 illustrates a robotic arm based on the arm fluid-driven actuator of FIG. 34 and made from fabric.

The robotic arm 800 is made from fabric similar to the fluid-driven actuator 100 and this is illustrated in FIG. 35.

In addition to the robotic arm 850, the fluid-driven actuator 100 may be adapted for other applications such as:

Multi-Segments Robotic Arm

FIG. 36a illustrates a multi-segment robotic arm 820 comprising multi-segments 822 with each segment 822 having a corrugated bending actuator similar to the bending actuator 200 of FIG. 1. Each segment 822 is spaced apart from the adjacent segment and is able to bend independently. The segments 822 can thus be controlled separately to achieve a more complex bending modality as shown in FIG. 36b which is a simplified representation of the multi-segment robotic arm 820 of FIG. 36a. Such a robotic arm 820 may be able to complete tasks in complicated environments.

Robotic Arm with More Degree of Freedoms (DoFs)

FIG. 37a illustrates a multi-degree robotic arm 840 which is able to bend or flex in varying angles in a three-dimensional space, and just in a two-dimensional plane. The multi-degree robotic arm 840 includes a central shaft 842 made from fabric which functions as a restraint member and the central shaft 842 also includes an inner cavity (not shown). The multi-degree robotic arm 840 further includes multiple segments of corrugated air bladders 844 arranged around the central shaft 842. In this way, when selected segments of the corrugated air bladders 844 are inflated, the multi-degree robotic arm 840 is able to bend in different directions in space, and thus, the range of motion is enhanced, as shown in FIG. 37b which is a simplified representation of the multi-degree robotic arm 840 of FIG. 37a.

FIG. 38a illustrates an alternative multi-degree robotic arm 860 called fabric-based soft robotic arm (SRA) that can manipulate objects within a 3-dimensional workspace. The SRA is mainly made from nylon fabrics coated with thermoplastic polyurethane (TPU). The SRA 860 includes a SRA main body 862, joint actuators 864 and gripper 866 which are made separately, combined and attached together, as shown in FIG. 38b. The total weight of the robotic arm is about 319 g and as shown in FIG. 38b, there are four linkages Link A, Link B, Link C and Link D.

FIGS. 39a and 39b show the fabrication of the SRA 860 which has a one long cylindrical SRA main body 862, and a diameter of 6.6 cm. The length of the SRA main body 862 allows the SRA 860 to reach a certain distance to grab an object. To make the specific structure as shown in FIG. 37b, a piece of TPU coated nylon fabric 868 of a required dimension is used and masking tape 870 is pasted on the TPU side of the nylon fabric 868 to prevent sealing of unwanted areas, as shown in FIG. 39a. The nylon fabric 868 is then folded and sealed similar to the method described in FIGS. 6 and 7 to form an intermediate structure illustrated in FIG. 39b. The SRA is inflated through a short silicone tube 872 at the proximal end. Along the SAR main body 862, there are three segments 874, 876,878 of relatively smaller inflation volumes. These segments 874,876,878 have lower bending stiffness than other portions, so the SRA is arranged to bend easier at these segments 874,876,878. The segments 874,876,878 divide the SRA 860 into four parts: Link A, which is the base of the SRA; link B, which can bend leftwards/rightwards relative to link A; link C, which can bend upward/downward relative to link B; and link D, which is the gripper part.

Figure 40A:
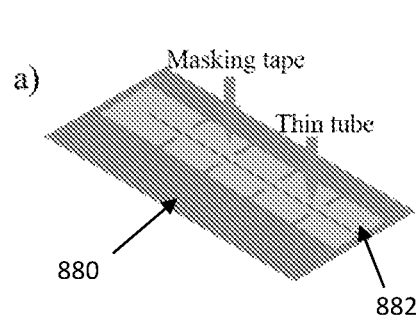
FIGS. 40a to 40c illustrate how to fabricate a joint actuator to be used in the SRA of FIGS. 38a and 38b.
Figure 40B:
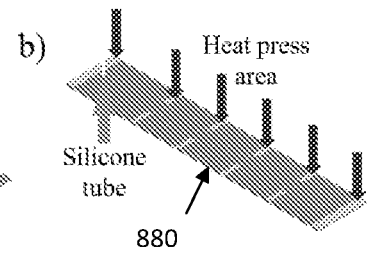
Figure 40C:
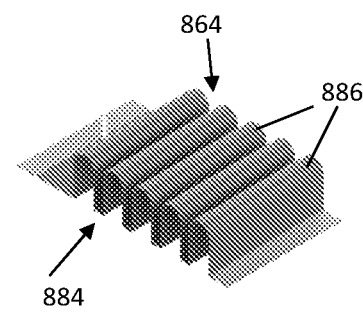

Four joint actuators 864 are attached at the first two segments 874,876, so that the joint actuators 864 cooperate to bend the SRA 860 in different directions upon inflation. To make the joint actuator 864, a piece of TPU coated nylon fabric 880 of a required dimension is used and masking tape 882 is pasted on the TPU side of the nylon fabric 880 to prevent sealing of unwanted areas, as shown in FIG. 40a. The nylon fabric 880 is then folded and sealed as shown in FIG. 40b similar to the method described in FIGS. 6 and 7 to form a corrugated air bladder structure 884 with folds 886 as illustrated in FIG. 40c to form the joint actuator 864. A thin tube is pasted on the inside surface to prevent collapsing of the folds 886. The portions that attached to the SRA main body 862 and specifically to the segments 874,876 are mostly sealed, leaving only a narrow air channel between each fold 886.

Two of the joint actuators 864 are attached to one of the segments 874,876 of the SRA main body 862 by wrapping and sealing a thin piece of fabric on the main body 862. It should be noted that the joint actuators 864 located at the first segment 874 is oriented differently from the joint actuators 864 located at the second segment 876. When the joint actuator 864 is inflated, each fold 886 becomes a small air bladder, and the folds 886 will press on each other to generate a bending moment on the SRA. Therefore, the SRA can bend at the low-stiffness segments 874,876 upon actuating the joint actuators 864. Since the inflation volume of the joint actuator 864 is small, a quick response reaction can be achieved.

The gripper 866 is made in a similar manner as the joint actuator 864, only the size and the masking area is adjusted accordingly. The gripper 866 is attached at the distal end of the arm in Link D. The gripper 866 has two bending points at the folding positions, so the gripper 866 can mimic the motion of a human hand and complete a full grabbing action. When releasing the object, the gripper 866 is deflated, and the pressure in the SRA main body 862 would straighten the gripper 866. The gripper 866 is designed to horizontally grab an object, similar to human grabbing motion.

Figure 41:
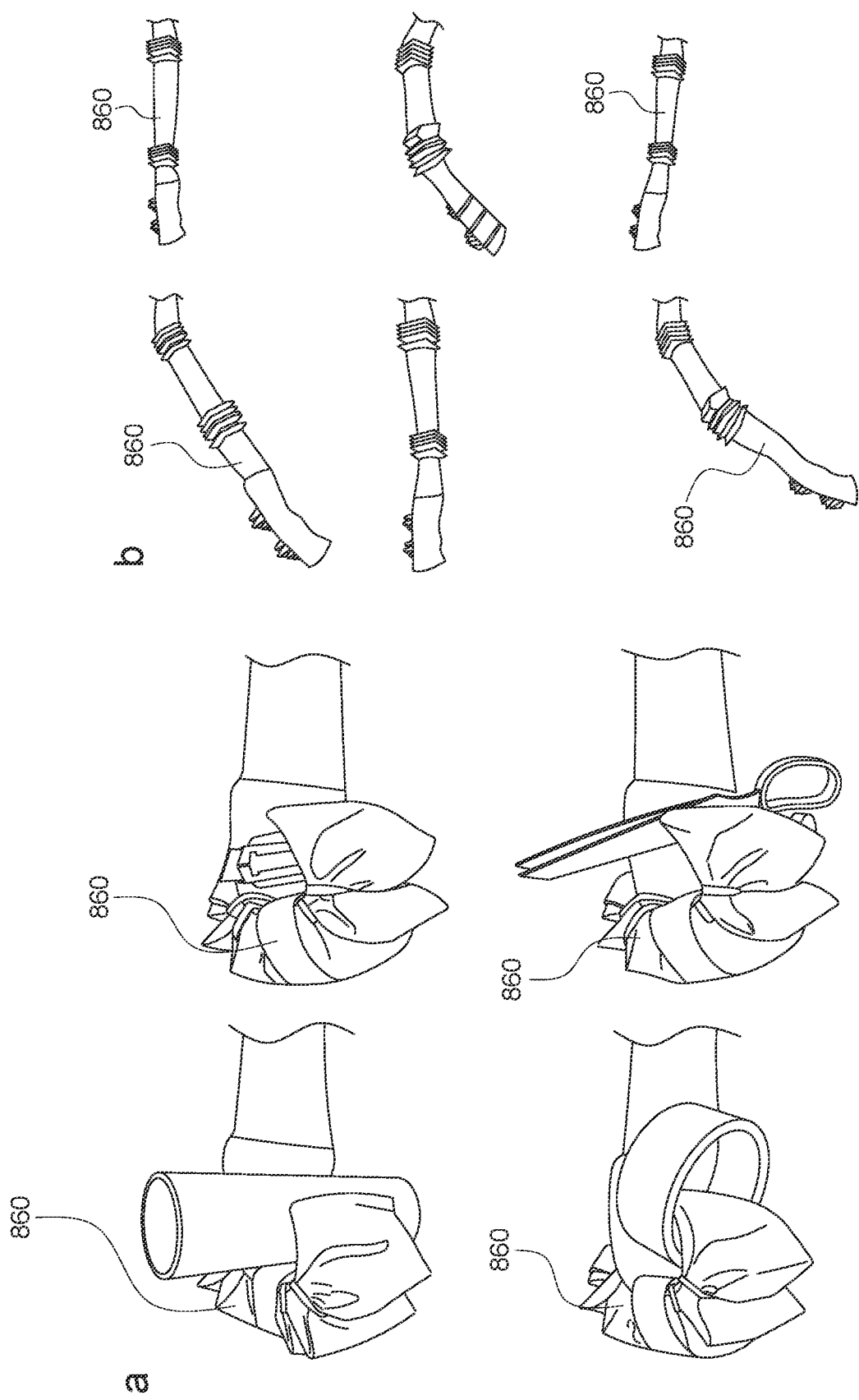
FIG. 41a shows a gripper of the SRA of FIGS. 38a and 38b being arranged to grab objects of different sizes and shapes.
FIG. 41b illustrates different motions of the SRA.

FIGS. 41a and 41b demonstrate functions of the SRA 860. FIG. 41a shows the gripper 866 of the SRA 860 being arranged to grab objects of different sizes and shapes, whereas different motions of the SRA 860 are illustrated in FIG. 41b. These demonstrations indicate that this SRA 860 is able to manipulate simple objects, and may be potentially useful for assisting people in daily lives, e.g. mounting on a wheelchair, or helping to tidy up the table.

Figure 42:
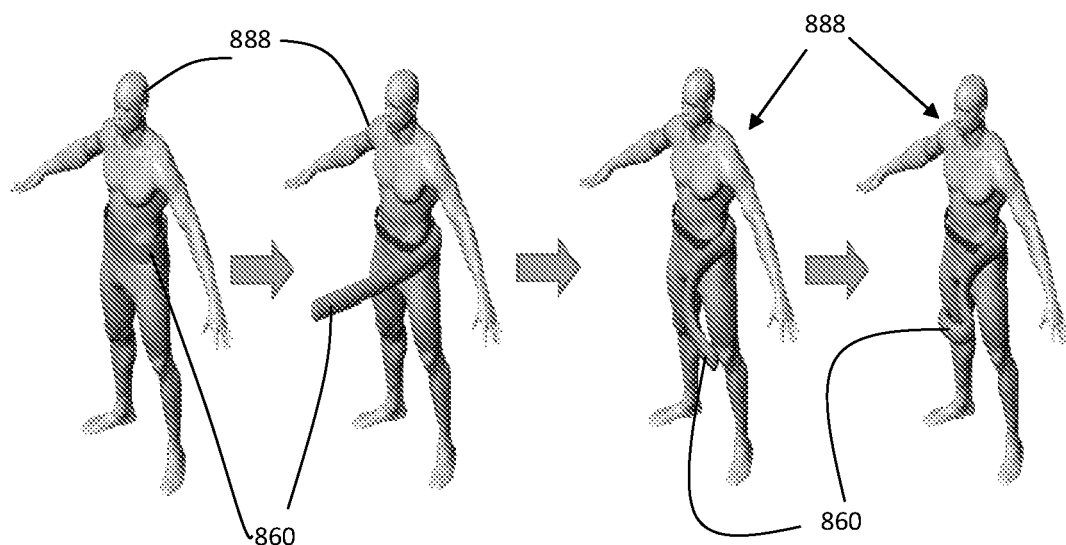
FIG. 42 is a simplified diagram of the SRA of FIGS. 38a and 38b being worn by a user as a fabric-based supernumerary arm.

In a specific application of the SRA 860, the SRA 860 may be adapted as wearable robotics such as a supernumerary arm or "sixth finger", particularly since the SRA 860 is light. FIG. 42 is a simplified diagram of the SRA 860 being worn by a user 888 as a fabric-based supernumerary arm. The SRA 860 may be wrapped around the waist or wrist brace and functions when the SRA 860 is inflated. The actuation system can be packed into a bag carried by the user 888. The additional robotic arm can assist people in working, for example, holding a tool.

In the above examples, a fabric based fluid-driven actuator 100 is used as an example. However, it would be apparent that other than using fabric-based soft actuators for exoskeleton applications, the fluid-driven actuator 100 may be replaced by polymer-based actuators such as that produced by casting/molding (large scale manufacturing) or 3D-printing (small scale prototyping) as described in FIG. 12b or 15.

In a further variation, it is envisaged that the robotic glove 650 and the fluid-driven actuators 100 may be fully polymer-based to create an exoskeleton sleeve for assistive, rehabilitation, and prosthetic applications (Polymeric Actuators+ Polymeric Glove or other wearable platform).

An exoskeleton sleeve 890 for assistive, rehabilitation, and prosthetic applications may be produced by integrating 3D printed actuators (polymer/TPU based) with a 3D printed wearable platform. The exoskeleton sleeve 890 can aid the fingers, wrist and elbow joints achieve their full range of motion and allow patients to conduct rehabilitation at home or use the exoskeleton sleeve as an assistive device for daily activities or even for prosthetic applications.

The exoskeleton sleeve 890 comprises three modular components—exoskeleton glove 892, exoskeleton wrist brace 894 and exoskeleton elbow brace 896 to assist range of motions in the three joints—finger, wrist and elbow joints respectively. All three modular components 892,894,896 are 3D printed or casted/molded using TPU, PLA or other polymer based materials.

Figure 43:
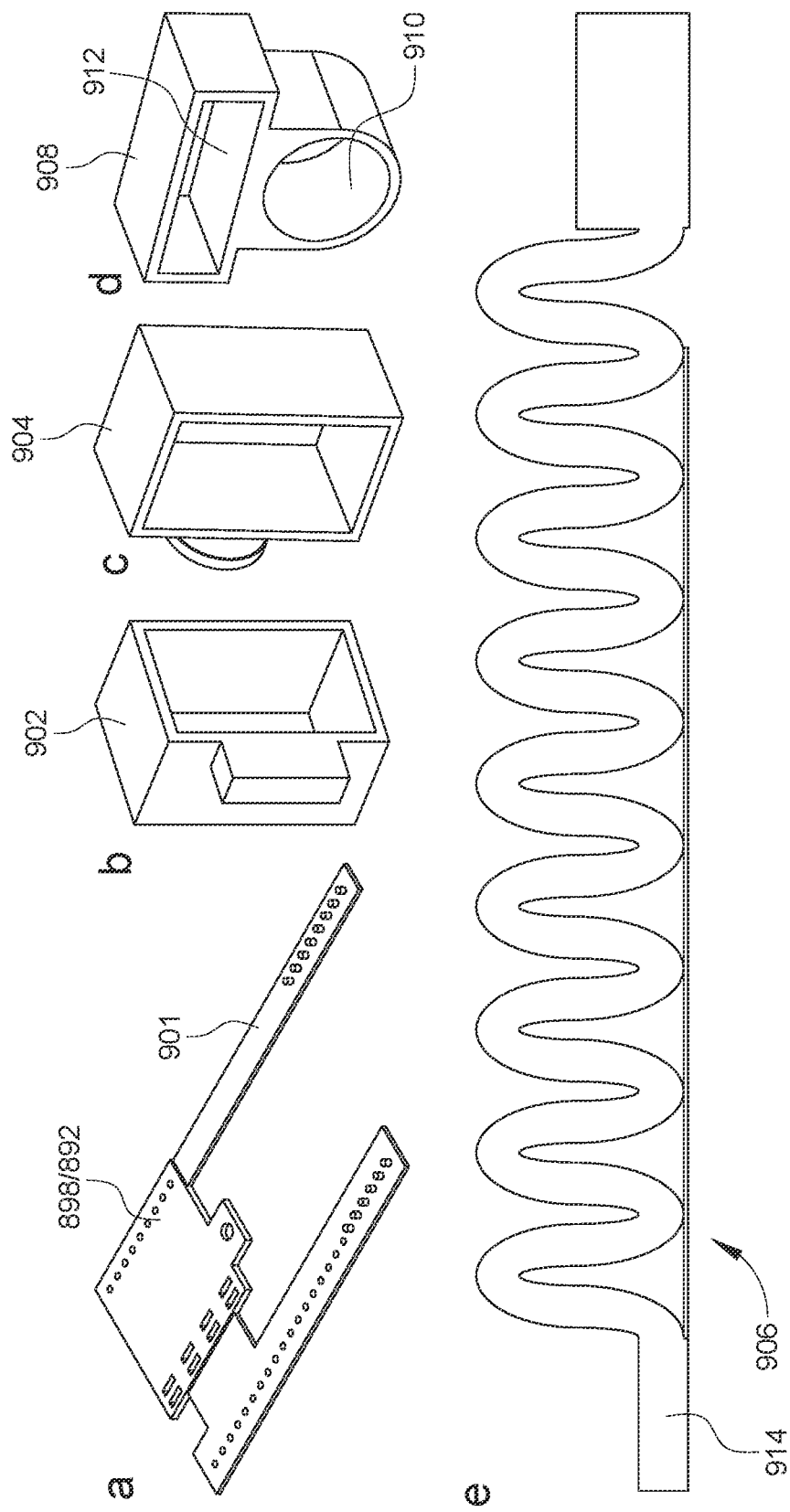
FIGS. 43a to 43e illustrates CAD models of various parts of an exoskeleton glove which includes at least one fluid-driven actuator of FIG. 1.

FIG. 43a illustrates a CAD model of a glove interface 898 for the exoskeleton glove 892 and the glove interface 898 functions as a base on which the other parts are attached. The glove interface 898 includes adjustable wrist and hand straps 900,901 that can be easily attached and detached to suit the comfort and fit of the user's hands. As shown in FIGS. 43b to 43e, the exoskeleton sleeve 890 also includes adaptors 902,904 to secure respective finger actuators 906 to the glove interface 898. The exoskeleton sleeve 890 further includes ring-like finger slot adaptors 908 having a finger slot 910 and an actuator slot 912 for receiving fingertips and for attaching to an extended front 914 of the finger actuator 906 respectively.

Figure 44:
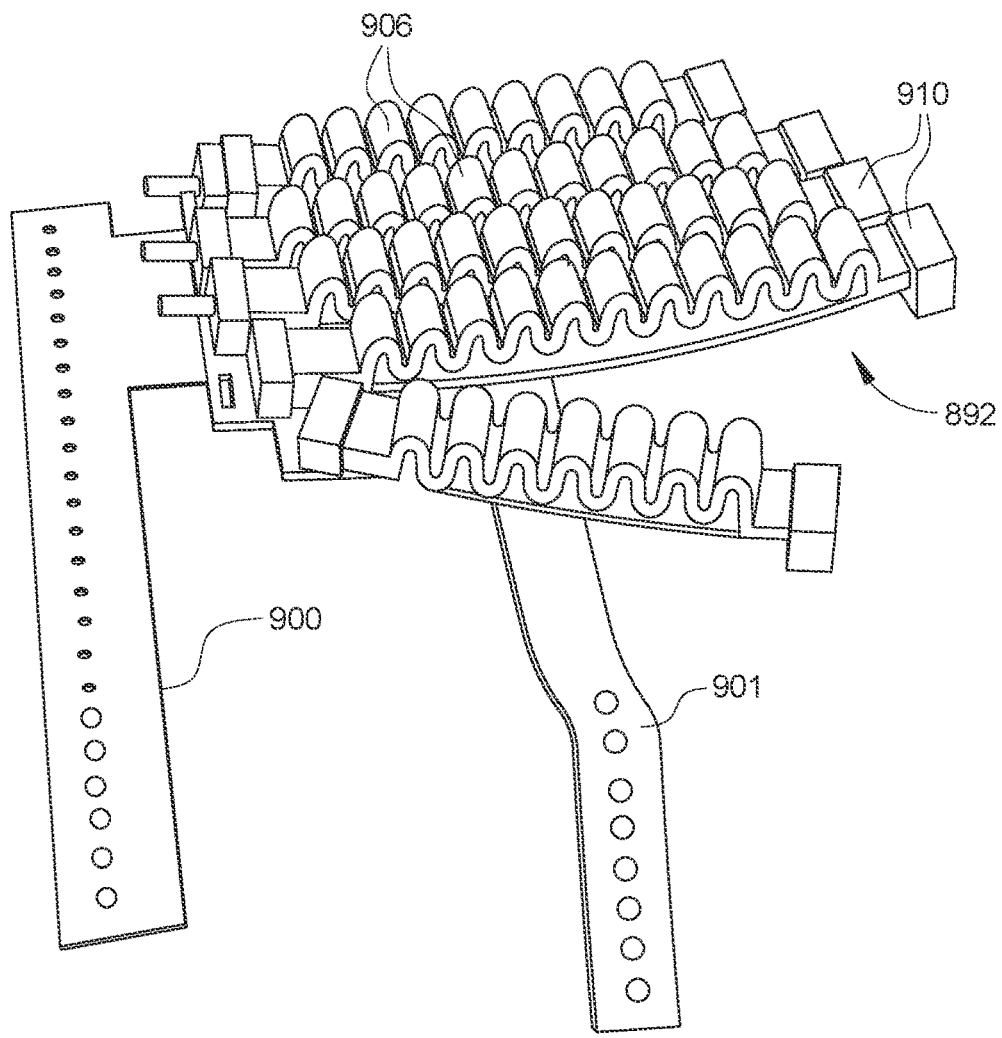
FIG. 44 is a perspective view of the assembled exoskeleton glove of FIGS. 43a to 43e which is fully-polymer based.
Figure 45:
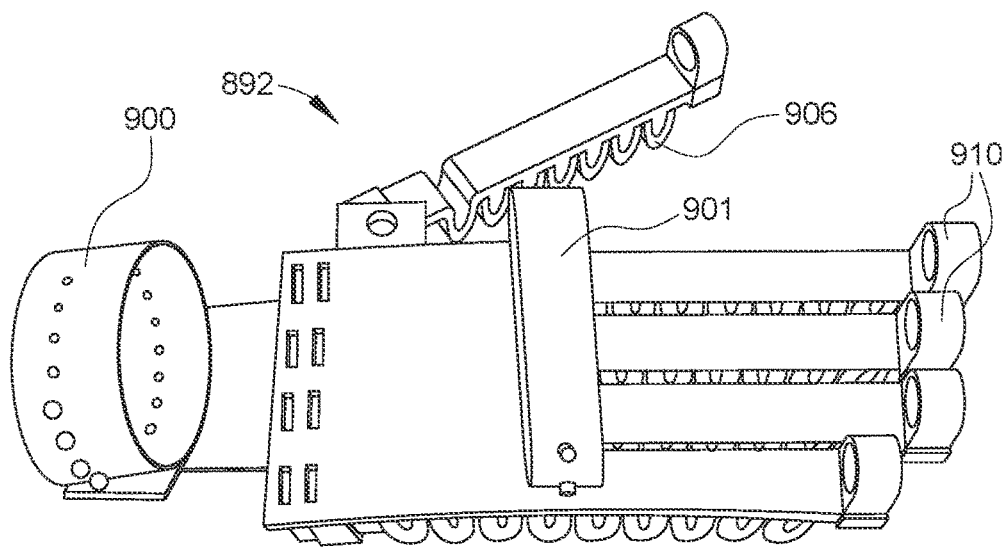
FIG. 45 illustrates the exoskeleton glove of FIG. 44 from the palmar view.
Figure 46:
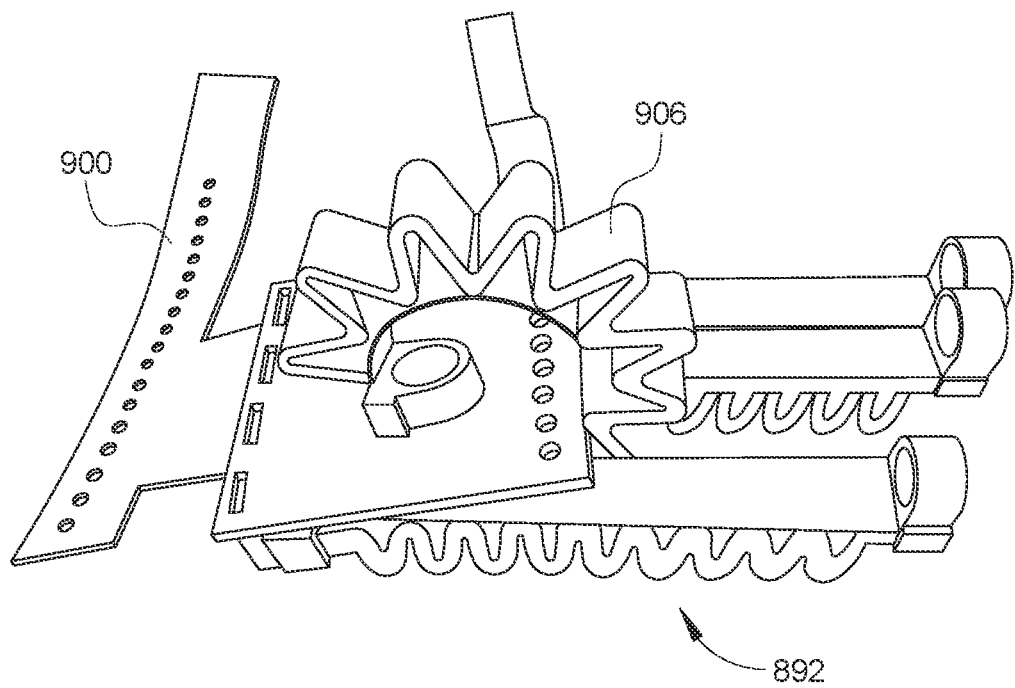
FIG. 46 illustrates the exoskeleton glove of FIG. 45 with one of its finger actuators flexed.

FIG. 44 is a perspective view of the exoskeleton glove 892 which is fully-polymer based (TPU) with the glove interface 898 which is customizable and the finger actuators. FIG. 45 illustrates the exoskeleton glove 892 from the palmar view and it should be appreciated that a user slips his fingertips into each of the finger slots 910 and use the hand strap 901 and the wrist strap 900 and to secure the exoskeleton glove 892 to the hand. FIG. 46 illustrates the exoskeleton glove 892 of FIG. 45 having one of its finger actuators 906 actuated to produce a bending action upon air pressurization of that actuator 906.

Figure 47:
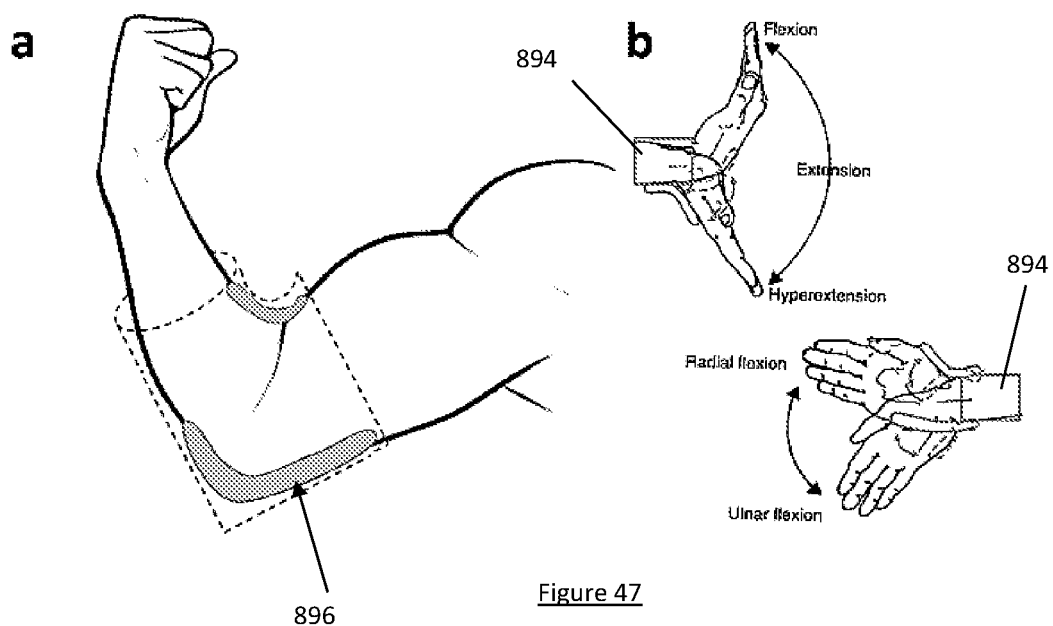
FIGS. 47a and 47b illustrates an exoskeleton elbow brace and an exoskeleton wrist brace having at least one fluid-driven actuator of FIG. 1.

FIG. 47a illustrates the exoskeleton elbow brace 896 when worn by a user to aid in elbow bending and extension and FIG. 47b illustrates the exoskeleton wrist brace 894 for flexing and extension of a user's wrist as well as radial flexion and ulnar flexion. It should be appreciated that both braces may be 3D printed.

Having now fully described the invention, it should be apparent to one of ordinary skill in the art that many modifications can be made hereto without departing from the scope as claimed.

The invention claimed is:
1. A fluid-driven actuator comprising
   a bending actuator including a first wall portion, a second wall portion cooperating with the first wall portion to define an undulating actuator profile, and an inner fluid bladder disposed between the first and second wall portions and following the undulating actuator profile, and a restraint member arranged to cooperate with the bending actuator to produce a plurality of motions in response to fluid supplied to the inner fluid bladder;

wherein the inner fluid bladder includes at least two different segments which are arranged to be supplied with fluid independently.

2. The fluid-driven actuator according to claim 1, wherein the restraint member is fixedly coupled to the bending actuator to form a plurality of folds to define the undulating actuator profile.

3. The fluid-driven actuator according to claim 2, wherein the plurality of folds includes segments of folds spaced apart from each segment.

4. The fluid-driven actuator according to claim 3, wherein a number of folds within each segment is the same; and wherein the restraint member is cylindrical and each segment of folds is arranged around the restraint member.

5. The fluid-driven actuator according to claim 2, further comprising a secondary bending actuator having an inner secondary fluid bladder.

6. The fluid-driven actuator according to claim 5 wherein the secondary bending actuator is arranged in opposing relations with the bending actuator with each fold of the secondary bending actuator in registration with respective folds of the bending actuator.

7. The fluid-driven actuator according to claim 6, wherein the secondary bending actuator is arranged above the bending actuator with each fold of the secondary bending actuator in registration with respective folds of the bending actuator.

8. The fluid-driven actuator according to claim 5, wherein the inner secondary fluid bladder and the inner fluid bladder are arranged to be supplied with fluid independently.

9. The fluid-driven actuator according to claim 5, wherein the inner secondary fluid bladder includes at least two different segments which are arranged to be supplied with fluid independently.

10. The fluid-driven actuator according to claim 1, wherein the restraint member is detachably coupled to the bending actuator to form a plurality of folds to define the undulating actuator profile.

11. The fluid-driven actuator according to claim 10, wherein each one of the plurality of folds forms a fold width which is adjustable by a user.

12. The fluid-driven actuator according to claim 10, wherein the bending actuator includes a plurality of flexion locking mechanisms, and the restraint member includes a plurality of restraint locking mechanisms arranged to be selectively attached to respective ones of the plurality of flexion locking mechanisms.

13. The fluid-driven actuator according to claim 1, further comprising a plurality of the bending actuators, pairs of the bending actuators are arranged in opposing relations at respective segments of the restraint member, wherein the pair of the bending actuators in one segment is oriented differently from the other pair of bending actuators in another segment.

14. The fluid-driven actuator according to claim 13, wherein the plurality of bending actuators further includes a further pair of bending actuators next to each other in a further segment.

15. A robotic glove comprising at least one fluid-driven actuator according to claim 1.

16. An exoskeleton brace for a limb, comprising at least one fluid-driven actuator according to claim 1.

17. A method of producing a fluid-driven actuator according to claim 1, comprising integrally forming the bending actuator with the inner fluid bladder.

18. The method of producing a fluid-driven actuator according to claim 17, further comprising bonding a Thermoplastic Polyurethane coated fabric to form the inner fluid bladder; and folding the inner fluid bladder to form the bending actuator.

19. A fluid-driven actuator comprising
a bending actuator including a first wall portion, a second wall portion cooperating with the first wall portion to define an undulating actuator profile, and
an inner fluid bladder disposed between the first and second wall portions and following the undulating actuator profile, and
a restraint member arranged to cooperate with the bending actuator to produce a plurality of motions in response to fluid supplied to the inner fluid bladder;
wherein the restraint member is fixedly coupled to the bending actuator to form a plurality of folds to define the undulating actuator profile;
and wherein the fluid-driven actuator further comprises a secondary bending actuator having an inner secondary fluid bladder;
wherein the inner secondary fluid bladder includes at least two different segments which are arranged to be supplied with fluid independently.

* * * * *